(12) United States Patent
Nishikawa

(10) Patent No.: US 9,164,767 B2
(45) Date of Patent: Oct. 20, 2015

(54) INSTRUCTION CONTROL CIRCUIT, PROCESSOR, AND INSTRUCTION CONTROL METHOD

(71) Applicant: SOCIONEXT INC., Yokohama-shi, Kanagawa (JP)

(72) Inventor: Takashi Nishikawa, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 426 days.

(21) Appl. No.: 13/713,894

(22) Filed: Dec. 13, 2012

(65) Prior Publication Data

US 2013/0191616 A1     Jul. 25, 2013

(30) Foreign Application Priority Data

Jan. 24, 2012   (JP) ................ 2012-012250

(51) Int. Cl.
*G06F 15/00*    (2006.01)
*G06F 9/30*     (2006.01)
*G06F 9/40*     (2006.01)
*G06F 9/345*    (2006.01)
*G06F 9/38*     (2006.01)

(52) U.S. Cl.
CPC ........ *G06F 9/30145* (2013.01); *G06F 9/30109* (2013.01); *G06F 9/30112* (2013.01); *G06F 9/345* (2013.01); *G06F 9/3838* (2013.01); *G06F 9/3857* (2013.01)

(58) Field of Classification Search
CPC .............................. G06F 9/3851; G06F 9/3893
USPC ......................................................... 712/216
See application file for complete search history.

(56) References Cited

U.S. PATENT DOCUMENTS 8,074,051 B2 *  12/2011   Hokenek et al. ................. 712/7

FOREIGN PATENT DOCUMENTS

JP            60-178580 A       9/1985

* cited by examiner

*Primary Examiner* — Chun-Kuan Lee
(74) *Attorney, Agent, or Firm* — Arent Fox LLP

(57) ABSTRACT

In a vector processing device, a data dependence detecting unit detects a data dependence relation between a preceding instruction and a succeeding instruction which are inputted from an instruction buffer, and an instruction issuance control unit controls issuance of an instruction based on a detection result thereof. When there is a data dependence relation between the preceding instruction and the succeeding instruction, the instruction issuance control unit generates a new instruction equivalent to processing related to a vector register including the data dependence relation with the succeeding instruction in processing executed by the preceding instruction and issues the new instruction between the preceding instruction and the succeeding instruction, and thereby a data hazard can be avoided between the preceding instruction and the succeeding instruction without making a stall occur.

7 Claims, 15 Drawing Sheets

FIG. 4A

| <VL=32> | CYCLE | 1 | 2 | 3 | 4 | 5 | 6 | 7 | 8 | 9 |
|---|---|---|---|---|---|---|---|---|---|---|
| vadd vr2,vr4,vr0 | pipelineA | 0 | 8 | 16 | 24 | 32 | 40 | 48 | 56 | |
| vaddh vr1,vr6,vr7 | pipelineB | | | | | | 32 | 40 | 48 | 56 |
| | pipelineC | | | | | | | | | |

FIG. 4B

| <VL=32> | CYCLE | 1 | 2 | 3 | 4 | 5 | 6 | 7 | 8 | 9 |
|---|---|---|---|---|---|---|---|---|---|---|
| vadd vr2,vr4,vr0 | pipelineA | 0 | 8 | 16 | 24 | 32 | 40 | 48 | 56 | |
| vadd' vr3,vr5,vr1 | pipelineB | | 32 | 40 | 48 | 56 | | | | |
| vaddh vr1,vr6,vr7 | pipelineC | | | 32 | 40 | 48 | 56 | | | |

FIG. 5A

| <VL=40> | CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| vadd vr2,vr4,vr0 | pipelineA | 0 | 8 | 16 | 24 | 32 | 40 | 48 | 56 | 64 | 72 | | | | |
| vaddh vr1,vr6,vr7 | pipelineB | | | | | | | | | | 64 | 72 | 80 | 88 | 96 |
| | pipelineC | | | | | | | | | | | | | | |

FIG. 5B

| <VL=40> | CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| vadd vr2,vr4,vr0 | pipelineA | 0 | 8 | 16 | 24 | 32 | 40 | 48 | 56 | 64 | 72 | | | | |
| vadd' vr3,vr5,vr1 | pipelineB | | 64 | 72 | | | | | | | | | | | |
| vaddh vr1,vr6,vr7 | pipelineC | | | 64 | 72 | 80 | 88 | 96 | | | | | | | |

FIG. 6A

| <VL=32> | CYCLE | 1 | 2 | 3 | 4 | 5 | 6 | 7 | 8 | 9 | 10 | 11 | 12 | 13 |
|---|---|---|---|---|---|---|---|---|---|---|---|---|---|---|
| vadd vr4,vr6,vr0 | pipelineA | 0 | 8 | 16 | 24 | 32 | 40 | 48 | 56 | | | | | |
| vadd vr1,vr8,vr10 | pipelineB | | | | | | 32 | 40 | 48 | 56 | 64 | 72 | 80 | 88 |
| | pipelineC | | | | | | | | | | | | | |

FIG. 6B

| <VL=32> | CYCLE | 1 | 2 | 3 | 4 | 5 | 6 | 7 | 8 | 9 | 10 | 11 | 12 | 13 |
|---|---|---|---|---|---|---|---|---|---|---|---|---|---|---|
| vadd vr4,vr6,vr0 | pipelineA | 0 | 8 | 16 | 24 | 32 | 40 | 48 | 56 | | | | | |
| vadd' vr5,vr7,vr1 | pipelineB | | 32 | 40 | 48 | 56 | | | | | | | | |
| vadd vr1,vr8,vr10 | pipelineC | | | 32 | 40 | 48 | 56 | 64 | 72 | 80 | 88 | | | |

F I G. 7A

| <VL=40> | CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| vadd vr4,vr6,vr0 | pipelineA | 0 | 8 | 16 | 24 | 32 | 40 | 48 | 56 | 64 | 72 | | | | | | | | | |
| vadd vr1,vr8,vr10 | pipelineB | | | | | | | | | | 64 | 72 | 80 | 88 | 96 | 104 | 112 | 120 | 128 | 136 |
| | pipelineC | | | | | | | | | | | | | | | | | | | |

F I G. 7B

| <VL=40> | CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| vadd vr4,vr6,vr0 | pipelineA | 0 | 8 | 16 | 24 | 32 | 40 | 48 | 56 | 64 | 72 | | | | | | | | | |
| vadd' vr5,vr7,vr1 | pipelineB | | | 64 | 72 | | | | | | | | | | | | | | | |
| vadd vr1,vr8,vr10 | pipelineC | | | | | 64 | 72 | 80 | 88 | 96 | 104 | 112 | 120 | 128 | 136 | | | | | |

FIG. 10A

| <VL=32> | CYCLE | 1 | 2 | 3 | 4 | 5 | 6 | 7 | 8 | 9 |
|---|---|---|---|---|---|---|---|---|---|---|
| vadd vr2,vr4,vr0 | pipelineA | 0 | 8 | 16 | 24 | 32 | 40 | 48 | 56 | |
| vaddh vr1,vr6,vr7 | pipelineB | | | | | | 32 | 40 | 48 | 56 |
| | pipelineC | | | | | | | | | |

FIG. 10B

| <VL=32> | CYCLE | 1 | 2 | 3 | 4 | 5 | 6 | 7 | 8 | 9 |
|---|---|---|---|---|---|---|---|---|---|---|
| vadd vr2,vr4,vr0 | pipelineA | 0 | 8 | 16 | 24 | | | | | |
| vadd' vr3,vr5,vr1 | pipelineB | | 32 | 40 | 48 | 56 | | | | |
| vaddh vr1,vr6,vr7 | pipelineC | | | 32 | 40 | 48 | 56 | | | |

FIG. 11A

| <VL=40> | CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| vadd vr2,vr4,vr0 | pipelineA | 0 | 8 | 16 | 24 | 32 | 40 | 48 | 56 | 64 | 72 | | | | |
| vaddh vr1,vr6,vr7 | pipelineB | | | | | | | | | | 64 | 72 | 80 | 88 | 96 |
| | pipelineC | | | | | | | | | | | | | | |

FIG. 11B

| <VL=40> | CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| vadd vr2,vr4,vr0 | pipelineA | 0 | 8 | 16 | 24 | 32 | 40 | 48 | 56 | | | | | | |
| vadd' vr3,vr5,vr1 | pipelineB | | 64 | 72 | | | | | | | | | | | |
| vaddh vr1,vr6,vr7 | pipelineC | | | 64 | 72 | 80 | 88 | 96 | | | | | | | |

FIG. 12A

| <VL=32> | CYCLE | 1 | 2 | 3 | 4 | 5 | 6 | 7 | 8 | 9 | 10 | 11 | 12 | 13 |
|---|---|---|---|---|---|---|---|---|---|---|---|---|---|---|
| vadd vr4,vr6,vr0 | pipelineA | 0 | 8 | 16 | 24 | 32 | 40 | 48 | 56 | | | | | |
| vadd vr1,vr8,vr10 | pipelineB | | | | | | 32 | 40 | 48 | 56 | 64 | 72 | 80 | 88 |
| | pipelineC | | | | | | | | | | | | | |

FIG. 12B

| <VL=32> | CYCLE | 1 | 2 | 3 | 4 | 5 | 6 | 7 | 8 | 9 | 10 | 11 | 12 | 13 |
|---|---|---|---|---|---|---|---|---|---|---|---|---|---|---|
| vadd vr4,vr6,vr0 | pipelineA | 0 | 8 | 16 | 24 | | | | | | | | | |
| vadd' vr5,vr7,vr1 | pipelineB | | 32 | 40 | 48 | 56 | | | | | | | | |
| vadd vr1,vr8,vr10 | pipelineC | | | 32 | 40 | 48 | 56 | 64 | 72 | 80 | 88 | | | |

FIG. 13A

| <VL=40> | CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| vadd vr4,vr6,vr0 | pipelineA | 0 | 8 | 16 | 24 | 32 | 40 | 48 | 56 | 64 | 72 |  |  |  |  |  |  |  |  |  |
| vadd vr1,vr8,vr10 | pipelineB |  |  |  |  |  |  |  |  | 64 | 72 | 80 | 88 | 96 | 104 | 112 | 120 | 128 | 136 |  |
|  | pipelineC |  |  |  |  |  |  |  |  |  |  |  |  |  |  |  |  |  |  |  |

FIG. 13B

| <VL=40> | CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| vadd vr4,vr6,vr0 | pipelineA | 0 | 8 | 16 | 24 | 32 | 40 | 48 | 56 |  |  |  |  |  |  |  |  |  |  |  |
| vadd' vr5,vr7,vr1 | pipelineB |  | 64 | 72 |  |  |  |  |  |  |  |  |  |  |  |  |  |  |  |  |
| vadd vr1,vr8,vr10 | pipelineC |  |  |  | 64 | 72 | 80 | 88 | 96 | 104 | 112 | 120 | 128 | 136 |  |  |  |  |  |  |

FIG. 14A

| <VL=32> | CYCLE | 1 | 2 | 3 | 4 | 5 | 6 | 7 | 8 | 9 |
|---|---|---|---|---|---|---|---|---|---|---|
| vadd vr0,vr4,vr2 | pipelineA | 0 | 8 | 16 | 24 | 32 | 40 | 48 | 56 | |
| vaddh vr6,vr7,vr1 | pipelineB | | | | | | 32 | 40 | 48 | 56 |
| | pipelineC | | | | | | | | | |

FIG. 14B

| <VL=32> | CYCLE | 1 | 2 | 3 | 4 | 5 | 6 | 7 | 8 | 9 |
|---|---|---|---|---|---|---|---|---|---|---|
| vadd vr0,vr4,vr2 | pipelineA | 0 | 8 | 16 | 24 | | | | | |
| vadd' vr1,vr5,vr3 | pipelineB | | 32 | 40 | 48 | 56 | | | | |
| vaddh vr6,vr7,vr1 | pipelineC | | | 32 | 40 | 48 | 56 | | | |

FIG. 15A

| <VL=40> | CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| vadd vr0,vr4,vr2 | pipelineA | 0 | 8 | 16 | 24 | 32 | 40 | 48 | 56 | 64 | 72 | | | | |
| vaddh vr6,vr7,vr1 | pipelineB | | | | | | | | | | 64 | 72 | 80 | 88 | 96 |
| | pipelineC | | | | | | | | | | | | | | |

FIG. 15B

| <VL=40> | CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| vadd vr0,vr4,vr2 | pipelineA | 0 | 8 | 16 | 24 | 32 | 40 | 48 | 56 | | | | | | |
| vadd' vr1,vr5,vr3 | pipelineB | | 64 | 72 | | | | | | | | | | | |
| vaddh vr6,vr7,vr1 | pipelineC | | | 64 | 72 | 80 | 88 | 96 | | | | | | | |

FIG. 16A

| <VL=32> | CYCLE | 1 | 2 | 3 | 4 | 5 | 6 | 7 | 8 | 9 | 10 | 11 | 12 | 13 |
|---|---|---|---|---|---|---|---|---|---|---|---|---|---|---|
| vadd vr0,vr4,vr6 | pipelineA | 0 | 8 | 16 | 24 | 32 | 40 | 48 | 56 | | | | | |
| vadd vr8,vr10,vr1 | pipelineB | | | | | | 32 | 40 | 48 | 56 | 64 | 72 | 80 | 88 |
| | pipelineC | | | | | | | | | | | | | |

FIG. 16B

| <VL=32> | CYCLE | 1 | 2 | 3 | 4 | 5 | 6 | 7 | 8 | 9 | 10 | 11 | 12 | 13 |
|---|---|---|---|---|---|---|---|---|---|---|---|---|---|---|
| vadd vr0,vr4,vr6 | pipelineA | 0 | 8 | 16 | 24 | | | | | | | | | |
| vadd' vr1,vr5,vr7 | pipelineB | | 32 | 40 | 48 | 56 | | | | | | | | |
| vadd vr8,vr10,vr1 | pipelineC | | | 32 | 40 | 48 | 56 | 64 | 72 | 80 | 88 | | | |

FIG. 17A

| <VL=40> | CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| vadd vr0,vr4,vr6 | pipelineA | 0 | 8 | 16 | 24 | 32 | 40 | 48 | 56 | 64 | 72 | | | | | | | | | |
| | pipelineB | | | | | | | | | 64 | 72 | 80 | 88 | 96 | 104 | 112 | 120 | 128 | 136 | |
| vadd vr8,vr10,vr1 | pipelineC | | | | | | | | | | | | | | | | | | | |

FIG. 17B

| <VL=40> | CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| vadd vr0,vr4,vr6 | pipelineA | 0 | 8 | 16 | 24 | 32 | 40 | 48 | 56 | | | | | | | | | | | |
| vadd' vr1,vr5,vr7 | pipelineB | | 64 | 72 | | | | | | | | | | | | | | | | |
| vadd vr8,vr10,vr1 | pipelineC | | | | | | | 64 | 72 | 80 | 88 | 96 | 104 | 112 | 120 | 128 | 136 | | | |

FIG. 19A
PROCESSING PROCEDURE OF HALFWORD CALCULATION INSTRUCTION (VL=32)

FIG. 19B
PROCESSING PROCEDURE OF WORD CALCULATION INSTRUCTION (VL=32)

F I G. 20A

PROCESSING PROCEDURE OF HALFWORD CALCULATION INSTRUCTION (VL=40)

| LOGICAL VR NUMBER | PHYSICAL VR NUMBER | CYCLE | | | | |
|---|---|---|---|---|---|---|
| | | 1 | 2 | 3 | 4 | 5 |
| vr0 | wr[0]~wr[39] | wr[0]-[7] | wr[8]-[15] | wr[16]-[23] | wr[24]-[31] | wr[32]-[39] |
| vr1 | wr[64]~wr[103] | wr[64]-[71] | wr[72]-[79] | wr[80]-[87] | wr[88]-[95] | wr[96]-[103] |
| vr2 | wr[128]~wr[167] | wr[128]-[135] | wr[136]-[143] | wr[144]-[151] | wr[152]-[159] | wr[160]-[167] |
| ⋮ | | | | | | |

F I G. 20B

PROCESSING PROCEDURE OF WORD CALCULATION INSTRUCTION (VL=40)

| LOGICAL VR NUMBER | PHYSICAL VR NUMBER | CYCLE | | | | | | | | | |
|---|---|---|---|---|---|---|---|---|---|---|---|
| | | 1 | 2 | 3 | 4 | 5 | 6 | 7 | 8 | 9 | 10 |
| vr0 | wr[0]~wr[79] | wr[0]-[7] | wr[8]-[15] | wr[16]-[23] | wr[24]-[31] | wr[32]-[39] | wr[40]-[47] | wr[48]-[55] | wr[56]-[63] | wr[64]-[71] | wr[72]-[79] |
| vr1 | wr[64]~wr[143] | wr[64]-[71] | wr[72]-[79] | wr[80]-[87] | wr[88]-[95] | wr[96]-[103] | wr[104]-[111] | wr[112]-[119] | wr[120]-[127] | wr[128]-[135] | wr[136]-[143] |
| vr2 | wr[128]~wr[207] | wr[128]-[135] | wr[136]-[143] | wr[144]-[151] | wr[152]-[159] | wr[160]-[167] | wr[168]-[175] | wr[176]-[183] | wr[184]-[191] | wr[192]-[199] | wr[200]-[207] |
| vr3 | wr[192]~wr[271] | wr[192]-[199] | wr[200]-[207] | wr[208]-[215] | wr[216]-[223] | wr[224]-[231] | wr[232]-[239] | wr[240]-[247] | wr[248]-[255] | wr[256]-[263] | wr[264]-[271] |
| ⋮ | | | | | | | | | | | |

FIG. 21A

|  | CYCLE | 1 | 2 | 3 | 4 | 5 | 6 | 7 | 8 | 9 |
|---|---|---|---|---|---|---|---|---|---|---|
| vadd vr2,vr4,vr0 | pipelineA | 0 | 8 | 16 | 24 | 32 | 40 | 48 | 56 |  |
| vaddh vr1,vr6,vr7 | pipelineB |  |  |  |  |  | 32 | 40 | 48 | 56 |

FIG. 21B

|  | CYCLE | 1 | 2 | 3 | 4 | 5 | 6 | 7 | 8 | 9 |
|---|---|---|---|---|---|---|---|---|---|---|
| vadd vr0,vr4,vr2 | pipelineA | 0 | 8 | 16 | 24 | 32 | 40 | 48 | 56 |  |
| vaddh vr6,vr7,vr1 | pipelineB |  |  |  |  |  | 32 | 40 | 48 | 56 |

INSTRUCTION CONTROL CIRCUIT, PROCESSOR, AND INSTRUCTION CONTROL METHOD

CROSS-REFERENCE TO RELATED APPLICATION

This application is based upon and claims the benefit of priority of the prior Japanese Patent Application No. 2012-012250, filed on Jan. 24, 2012, the entire contents of which are incorporated herein by reference.

FIELD

The embodiments discussed herein are directed to an instruction control circuit, a processor, and an instruction control method.

BACKGROUND

A vector processing device (vector processor) performs calculation processing or the like in a pipelined manner according to an instruction on array-type data stored in a vector register file. The vector processing device has a plurality of execution pipelines as illustrated in FIG. 18, and the execution pipelines process the array data respectively.

FIG. 18 is a block diagram illustrating a structural example of the vector processing device. In FIG. 18, IF denotes an instruction fetch stage, ID denotes an instruction decoding stage, and EX denotes a calculation execution stage. The vector processing device has an instruction buffer 101, a data dependence detecting unit 102, an instruction issuance control unit 103, execution pipelines 104, a vector register file 105, and a multiplexer circuit 106. FIG. 18 illustrates a vector processing device having four execution pipelines 104, which are pipelines A, B, C, and D.

The instruction buffer 101 stores an instruction (vector instruction) read from a storage device. The data dependence detecting unit 102 determines whether or not a vector register specified by a preceding instruction which is executed precedingly overlaps with a vector register specified by a succeeding instruction which succeeds the preceding instruction, so as to detect a data dependence relation between the preceding instruction and the succeeding instruction. The instruction issuance control unit 103 issues an instruction to an execution pipeline 104 upon reception of an instruction stored in the instruction buffer 101 and a detection result in the data dependence detecting unit 102. The instruction issuance control unit 103 requests a next instruction from the instruction buffer 101 when there is a vacancy in the execution pipelines 104, determines which execution pipeline 104 an instruction is to be issued to according to the data dependence relation and vacant states of the execution pipelines 104, and issues the instruction.

The execution pipelines 104 execute processing on array data by complying with the instruction received from the instruction issuance control unit 103. Each of the execution pipelines 104 has a sequencer 107 and a calculating unit 108. The sequencer 107 performs control related to execution of the instruction received from the instruction issuance control unit 103. For example, the sequencer 107 instructs instruction execution or instructs execution of reading or writing of data from or to the vector register file 105. The calculating unit 108 has a plurality of calculators 109 and executes processing according to an instruction from the sequencer 107. Here, in this specification, for convenience of explanation, it is assumed that the calculating unit 108 has eight 16-bit calculators 109, and 32-bit data are processed using two calculators.

The vector register file 105 stores array data. The array data stored in the vector register file 105 are supplied to the execution pipelines 104 via the multiplexer circuit 106. Note that although not being written in the vector register file 105 yet, it is possible to supply array data generated already as a calculation result to the execution pipelines 104 via the multiplexer circuit 106.

The size of the array data, that is, the number of array elements are specified by a vector length (VL). The array elements whose number is specified by the vector length (VL) forms one array register, and one logical vector register number corresponds to one array register. The size of each array element is assigned according to a data word length handled by the vector processing device. A head value of the physical vector register number corresponding to the logical vector register number is a power of two. When the vector length (VL) is a power of two, a value obtained by multiplying the vector length (VL) by a logical vector register number is the start value of the physical vector register number corresponding to this logical vector register number. Further, when the vector length (VL) is not a power of two, a value obtained by multiplying the smallest value among powers of two equal to or larger than the vector length (VL) by a logical vector register number is the start value of the physical vector register number corresponding to this logical vector register number.

In the following description, using i, j as indexes, vri represents the register of a logical vector register number i, and vr[j] represents the register of a physical vector register number j. When the data word length handled by the vector processing device is Halfword (16 bits), one of registers vr[j] corresponds to one array element, and when the data word length is Word (32 bits), a pair of registers vr[j] corresponds to one array element.

For example, the correspondence of the logical vector register number and the physical vector register number of the vector register when the vector length (VL) is 32, which is a power of two, and the order of processing when calculation processing is executed are as illustrated in FIGS. 19A and 19B. Further, for example, the correspondence of the logical vector register number and the physical vector register number of the vector register when the vector length (VL) is 40, which is a power of two, and the order of processing when calculation processing is executed are as illustrated in FIGS. 20A and 20B.

As illustrated in FIG. 19A, when the data word length is Halfword, a vector register vr[32×i] to vr[32×i+31] with a physical number (32×i) to (32×i+31) corresponds to a vector register vri with a logical number i. Then, for example, when a vector register vr0 with a logical number 0 is specified by a Halfword calculation instruction, vector registers vr[0] to vr[7] with physical numbers 0 to 7 are targets of processing in a first cycle, and vector registers vr[8] to vr[15] with physical numbers 8 to 15 are targets of processing in a second cycle. Further, vector registers vr[16] to vr[23] with physical numbers 16 to 23 are targets of processing in a third cycle, and vector registers vr[24] to vr[31] with physical numbers 24 to 31 are targets of processing in a fourth cycle.

Further, as illustrated in FIG. 19B, when the data word length is Word, a vector register vr[32×i] to vr[32×i+63] with a physical number (32×i) to (32×i+63) corresponds to the vector register vri with the logical number i. Then, for example, when the vector register vr0 with the logical number 0 is specified by a Word calculation instruction, the vector registers vr[0] to vr[7] with the physical numbers 0 to 7 are targets of processing in the first cycle, and the vector registers vr[8] to vr[15] with the physical numbers 8 to 15 are targets of processing in the second cycle. The vector registers vr[16] to vr[23] with the physical numbers 16 to 23 are targets of processing in the third cycle, the vector registers vr[24] to vr[31] with the physical numbers 24 to 31 are targets of processing in the fourth cycle, and vector registers vr[32] to vr[39] with physical numbers 32 to 39 are targets of processing in a fifth cycle. Further, vector registers vr[40] to vr[47] with physical numbers 40 to 47 are targets of processing in a sixth cycle, and vector registers vr[48] to vr[55] with physical numbers 48 to 55 are targets of processing in a seventh cycle, and vector registers vr[56] to vr[63] with physical numbers 56 to 63 are targets of processing in an eighth cycle.

As illustrated in FIG. 20A, when the data word length is Halfword, a vector register vr[64×i] to vr[64×i+39] with a physical number (64×i) to (64×i+39) corresponds to the vector register vri with the logical number i. Then, for example, when the vector register vr0 with the logical number 0 is specified by the Halfword calculation instruction, registers to be targets of processing in the first cycle to the fourth cycle are the same as those when the vector length (VL) is 32. Moreover, the vector registers vr[32] to vr[39] with the physical numbers 32 to 39 are targets of processing in the fifth cycle.

Further, as illustrated in FIG. 20B, when the data word length is Word, a vector register vr[64×i] to vr[64×i+79] with a physical number (64×i) to (64×i+79) corresponds to the vector register vri with the logical number i. Then, for example, when the vector register vr0 with the logical number 0 is specified by the Word calculation instruction, registers to be targets of processing in the first cycle to the eighth cycle are the same as those when the vector length (VL) is 32. Moreover, vector registers vr[64] to vr[71] with physical numbers 64 to 71 are targets of processing in a ninth cycle, and vector registers vr[72] to vr[79] with physical numbers 72 to 79 are targets of processing in a tenth cycle.

Upon reception of an instruction "INS A, B, C", the vector processing device illustrated in FIG. 18 performs calculation processing corresponding to the instruction INS using corresponding data in a vector register with a logical vector register number A and a vector register with a logical vector register number B, and stores a calculation result in a vector register with a logical vector register number C.

For example, when a Halfword calculation instruction "vaddh vr1, vr6, vr7" is issued to a certain execution pipeline 104. The instruction "vaddh vr1, vr6, vr7" causes a result of adding data in the vector register vr1 with the logical number 1 and the vector register vr6 with the logical number 6 to be stored in the vector register vr7 with the logical number 7. The execution pipeline 104 which has received this instruction executes the following calculation processing in the first cycle.

$$vr[224] = vr[32] + vr[192]$$

$$vr[225] = vr[33] + vr[193]$$

$$\ldots$$

$$vr[231] = vr[39] + vr[199]$$

Thereafter, when the vector length (VL) is 32, calculation processing is performed while changing the vector registers which are targets of processing in each cycle until the fourth cycle, and when the vector length (VL) is 40, calculation processing is performed while changing the vector registers which are targets of processing in each cycle until the fifth cycle.

Further, for example, when a Word calculation instruction "vadd vr2, vr4, vr0" is issued to a certain execution pipeline 104. The instruction "vadd vr2, vr4, vr0" causes a result of adding data in the vector register vr2 with the logical number 2 and the vector register vr4 with the logical number 4 to be stored in the vector register vr0 with the logical number 0. The execution pipeline 104 which has received this instruction executes the following calculation processing in the first cycle.

$$vr[1-0]=vr[65-64]+vr[129-128]$$

$$vr[3-2]=vr[67-66]+vr[131-130]$$

$$vr[5-4]=vr[69-68]+vr[133-132]$$

$$vr[7-6]=vr[71-70]+vr[135-134]$$

Thereafter, when the vector length (VL) is 32, calculation processing is performed while changing the vector registers which are targets of processing in each cycle until the eighth cycle, and when the vector length (VL) is 40, calculation processing is performed while changing the vector registers which are targets of processing in each cycle until a tenth cycle.

Thus, in the vector processing device, one instruction is executed across plural cycles in one execution pipeline. The execution pipeline is occupied across the plural cycles until processing is completed regarding the one instruction. Further, the respective execution pipelines included in the vector processing device are operable in parallel. Therefore, when the register specified by a preceding instruction overlaps with the register specified by a succeeding instruction, issuance timings of the instructions with each other is adjusted so that access to the overlapping register is performed properly and is reflected on the respective processing of the preceding instruction and the succeeding instruction. For this purpose, the vector processing device determines presence of the data dependence relation between the preceding instruction and the succeeding instruction when issuing the instructions.

Hazards related to the data dependence relation (data hazards) include a RAW (read after write) hazard and a WAR (write after read) hazard. The RAW hazard is a hazard such that after writing to a vector register is performed by the preceding instruction, in processing performed by the succeeding instruction using the vector register in which writing is performed by the preceding instruction, reading by the succeeding instruction is performed before the writing by the preceding instruction. Further, the WAR hazard is a hazard such that after reading from a vector register is performed by the preceding instruction, in processing performed by the succeeding instruction to write in the same vector register, writing by the succeeding instruction is performed before the reading by the preceding instruction.

When the data dependence relation is detected between the preceding instruction and the succeeding instruction, the vector processing device performs control to delay issuance of the succeeding instruction for a certain cycle until processing by the preceding instruction is performed, thereby avoiding the data hazard by a stall. FIGS. 21A and 21B are diagrams illustrating an operation example of avoiding the data hazard. Note that the vector length (VL) in the example illustrated in FIGS. 21A and 21B is 32.

FIG. 21A illustrates an example of an issuance timing of instruction related to avoidance of the RAW hazard. FIG. 21A illustrates an example in which "vadd vr2, vr4, vr0" is issued as the preceding instruction to a pipeline A, and as the succeeding instruction thereafter, "vaddh vr1, vr6, vr7" is issued to a pipeline B. The instruction "vadd vr2, vr4, vr0" is a Word calculation instruction for storing a result of adding data in the vector register vr2 with the logical number 2 and the vector register vr4 with the logical number 4 in the vector register vr0 with the logical number 0. Further, the instruction "vaddh vr1, vr6, vr7" is a Halfword calculation instruction for storing a result of adding data in the vector register vr1 with the logical number 1 and the vector register vr6 with the logical number 6 in the vector register vr7 with the logical number 7. In FIG. 21A, for the instruction "vadd vr2, vr4, vr0", the physical number (head value) of the vector register vr0 with the logical number 0 which is a destination register in which the calculation result is written is illustrated in every cycle. Further, for the instruction "vaddh vr1, vr6, vr7", the physical number (head value) of the vector register vr1 with the logical number 1 which is a source register from which data used in the calculation operation is read is illustrated in every cycle.

In processing by the preceding instruction "vadd vr2, vr4, vr0" and processing by the succeeding instruction "vaddh vr1, vr6, vr7", the vector registers vr[32] to vr[63] with the physical numbers 32 to 63 overlap. For example, in the vector registers vr[32] to vr[39] with the physical numbers 32 to 39, reading of data is performed in the beginning cycle in processing of the succeeding instruction "vaddh vr1, vr6, vr7", but writing of data is performed in the fifth cycle in processing of the preceding instruction "vadd vr2, vr4, vr0". In order to reflect a processing result of the preceding instruction on processing of the succeeding instruction, reading of data from the vector registers vr[32] to vr[39] with the physical numbers 32 to 39 by the succeeding instruction "vaddh vr1, vr6, vr7" needs to be performed after the cycle 5. Accordingly, in the cycle 2 to cycle 5, a stall due to the RAW hazard is made to occur, and the succeeding instruction "vaddh vr1, vr6, vr7" is issued in the cycle 6.

FIG. 21B illustrates an example of an issuance timing of instruction related to avoidance of the WAR hazard. FIG. 21B illustrates an example in which "vadd vr0, vr4, vr2" is issued as the preceding instruction to the pipeline A, and as the succeeding instruction thereafter, "vaddh vr6, vr7, vr1" is issued to the pipeline B. The instruction "vadd vr0, vr4, vr2" is a Word calculation instruction for storing a result of adding data in the vector register vr0 with the logical number 0 and the vector register vr4 with the logical number 4 in the vector register vr2 with the logical number 2. Further, the instruction "vaddh vr6, vr7, vr1" is a Halfword calculation instruction for storing a result of adding data in the vector register vr6 with the logical number 6 and the vector register vr7 with the logical number 7 in the vector register vr1 with the logical number 1. In FIG. 21B, for the instruction "vadd vr0, vr4, vr2", the physical number (head value) of the vector register vr0 with the logical number 0 which is a source register from which data used in the calculation operation is read is illustrated in every cycle. Further, for the instruction "vaddh vr6, vr7, vr1", the physical number (head value) of the vector register vr1 with the logical number 1 which is a destination register in which the calculation result is written is illustrated in every cycle.

In processing by the preceding instruction "vadd vr0, vr4, vr2" and processing by the succeeding instruction "vaddh vr6, vr7, vr1", the vector registers vr[32] to vr[63] with the physical numbers 32 to 63 overlap. For example, in the vector registers vr[32] to vr[39] with the physical numbers 32 to 39, writing of data is performed in the beginning cycle in processing of the succeeding instruction "vaddh vr6, vr7, vr1", but reading of data is performed in the fifth cycle in processing of the preceding instruction "vadd vr0, vr4, vr2". In order to perform processing of the preceding instruction before a processing result of the succeeding instruction is written, writing of data in the vector registers vr[32] to vr[39] with the physical numbers 32 to 39 by the succeeding instruction "vaddh vr6, vr7, vr1" may be performed after the cycle 5. Accordingly, in the cycle 2 to cycle 5, a stall due to the WAR hazard is made to occur, and the succeeding instruction "vaddh vr6, vr7, vr1" is issued in the cycle 6.

Further, in Patent Document 1 below, there is proposed a technique such that, when there is register interference (the data dependence relation exists between the preceding instruction and the succeeding instruction) and the preceding instruction needs a longer processing time than the succeeding instruction, the starting time of the succeeding instruction is set to eliminate the necessity to wait until execution of the preceding instruction is completed, so as to improve processing performance.

[Patent Document 1] Japanese Laid-open Patent Publication No. 60-178580

However, in the vector processing device, due to handling of array-type data, there is a problem that the stall period becomes long when the stall due to the data hazard is made to occur. For example, there is a problem that when a vector register storing a processing result from the middle of processing of the preceding Word instruction is used by the succeeding Halfword instruction, the succeeding instruction is stalled for a long period until writing by the preceding instruction in the vector register used in the succeeding instruction is completed.

SUMMARY

One aspect of the instruction control circuit has an instruction buffer which stores a plurality of instructions; a data dependence detecting unit which detects a data dependence relation between a preceding instruction and a succeeding instruction among the plurality of instructions inputted from the instruction buffer; and an instruction issuance control unit which controls issuance of an instruction based on a detection result of the data dependence detecting unit. The instruction issuance control unit generates a new instruction including a same instruction type as the preceding instruction when there is a data dependence relation between the preceding instruction and the succeeding instruction, and issues the generated new instruction between the preceding instruction and the succeeding instruction. The instruction issuance control unit determines identification information of a second register of the new instruction from identification information of a first register of the succeeding instruction in the data dependence relation with the preceding instruction, calculates a difference between identification information of a second register of the preceding instruction and the identification information of the second register of the new instruction, determines identification information of a first register of the new instruction from the calculated difference and identification information of a first register of the preceding instruction, and determines a processing completion cycle of the new instruction from a processing completion cycle of the preceding instruction and a vector length, to thereby generate the new instruction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is a diagram illustrating a processing operation example (VL=32, RAW hazard avoidance) in the general technology;

FIG. 4B is a diagram illustrating a processing operation example (VL=32, RAW hazard avoidance) in the first embodiment;

FIG. 5A is a diagram illustrating a processing operation example (VL=40, RAW hazard avoidance) in the general technology;

FIG. 5B is a diagram illustrating a processing operation example (VL=40, RAW hazard avoidance) in the first embodiment;

FIG. 6A is a diagram illustrating a processing operation example (VL=32, RAW hazard avoidance) in the general technology;

FIG. 6B is a diagram illustrating a processing operation example (VL=32, RAW hazard avoidance) in the first embodiment;

FIG. 7A is a diagram illustrating a processing operation example (VL=40, RAW hazard avoidance) in the general technology;

FIG. 7B is a diagram illustrating a processing operation example (VL=40, RAW hazard avoidance) in the first embodiment;

FIG. 10A is a diagram illustrating a processing operation example (VL=32, RAW hazard avoidance) in the general technology;

FIG. 10B is a diagram illustrating a processing operation example (VL=32, RAW hazard avoidance) in the second embodiment;

FIG. 11A is a diagram illustrating a processing operation example (VL=40, RAW hazard avoidance) in the general technology;

FIG. 11B is a diagram illustrating a processing operation example (VL=40, RAW hazard avoidance) in the second embodiment;

FIG. 12A is a diagram illustrating a processing operation example (VL=32, RAW hazard avoidance) in the general technology;

FIG. 12B is a diagram illustrating a processing operation example (VL=32, RAW hazard avoidance) in the second embodiment;

FIG. 13A is a diagram illustrating a processing operation example (VL=40, RAW hazard avoidance) in the general technology;

FIG. 13B is a diagram illustrating a processing operation example (VL=40, RAW hazard avoidance) in the second embodiment;

FIG. 14A is a diagram illustrating a processing operation example (VL=32, WAR hazard avoidance) in the general technology;

FIG. 14B is a diagram illustrating a processing operation example (VL=32, WAR hazard avoidance) in the second embodiment;

FIG. 15A is a diagram illustrating a processing operation example (VL=40, WAR hazard avoidance) in the general technology;

FIG. 15B is a diagram illustrating a processing operation example (VL=40, WAR hazard avoidance) in the second embodiment;

FIG. 16A is a diagram illustrating a processing operation example (VL=32, WAR hazard avoidance) in the general technology;

FIG. 16B is a diagram illustrating a processing operation example (VL=32, WAR hazard avoidance) in the second embodiment;

FIG. 17A is a diagram illustrating a processing operation example (VL=40, WAR hazard avoidance) in the general technology;

FIG. 17B is a diagram illustrating a processing operation example (VL=40, WAR hazard avoidance) in the second embodiment;

FIGS. 19A and 19B are diagrams illustrating an example of the correspondence of a logical number and a physical number of a vector register and the order of processing;

FIGS. 20A and 20B are diagrams illustrating an example of the correspondence of a logical number and a physical number of a vector register and the order of processing; and FIGS. 21A and 21B are diagrams illustrating an operation example of avoiding the data hazard.

DESCRIPTION OF EMBODIMENTS

Hereinafter, embodiments will be explained based on the drawings.

Figure 18:
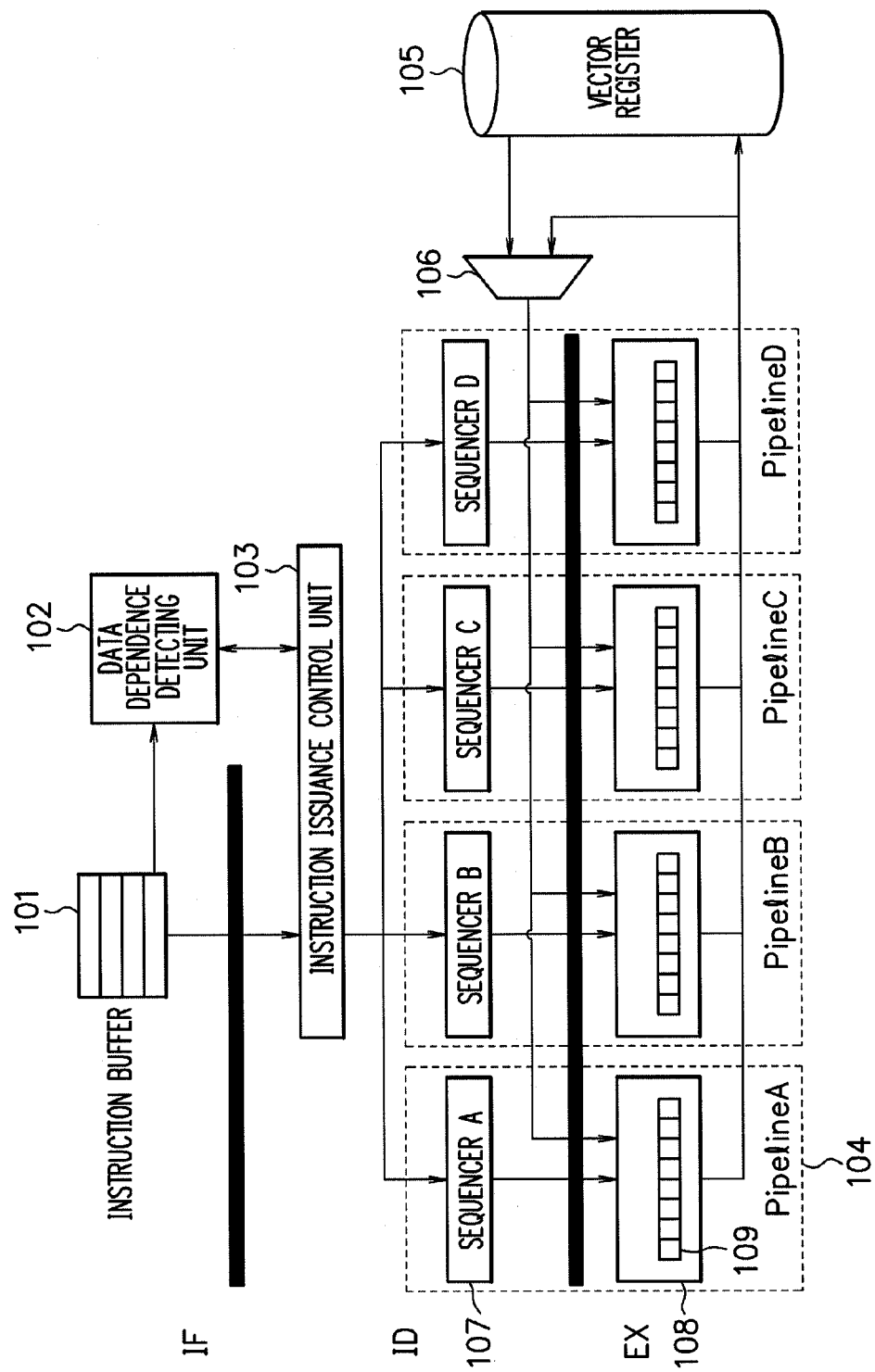
FIG. 18 is a diagram illustrating a structural example of a vector processing device.

The overall structure of a vector processing device (vector processor) in the embodiments is similar to the vector processing device illustrated in FIG. 18, and thus the description thereof is omitted. Note that in FIG. 18, a vector processing device having four execution pipelines is exemplified, but it is not restrictive. The vector processing device in the embodiments will suffice as long as it has a plurality of execution pipelines, and the number of execution pipelines which the vector processing device has is arbitrary. In the following, instruction issuance control in the vector processing device according to the embodiments will be described.

Note that in the following description, for a data word length of Halfword (16 bits), a Halfword calculation instruction for adding data in a vector register with a logical vector register number A and a vector register with a logical vector register number B, and storing a processing result thereof in a vector register with a logical vector register number C, is denoted as "vaddh A, B, C". Further, for a data word length of Word (32 bits), a Word calculation instruction for adding data in the vector register with the logical vector register number A and the vector register with the logical vector register number B, and storing a processing result thereof in the vector register with the logical vector register number C, is denoted as "vadd A, B, C". Further, the logical vector register number of a vector register will also be referred simply to as a logical number, and the physical vector register number of a vector register will also be referred simply to as a physical number.

First Embodiment

A first embodiment will be described.

Figure 1:
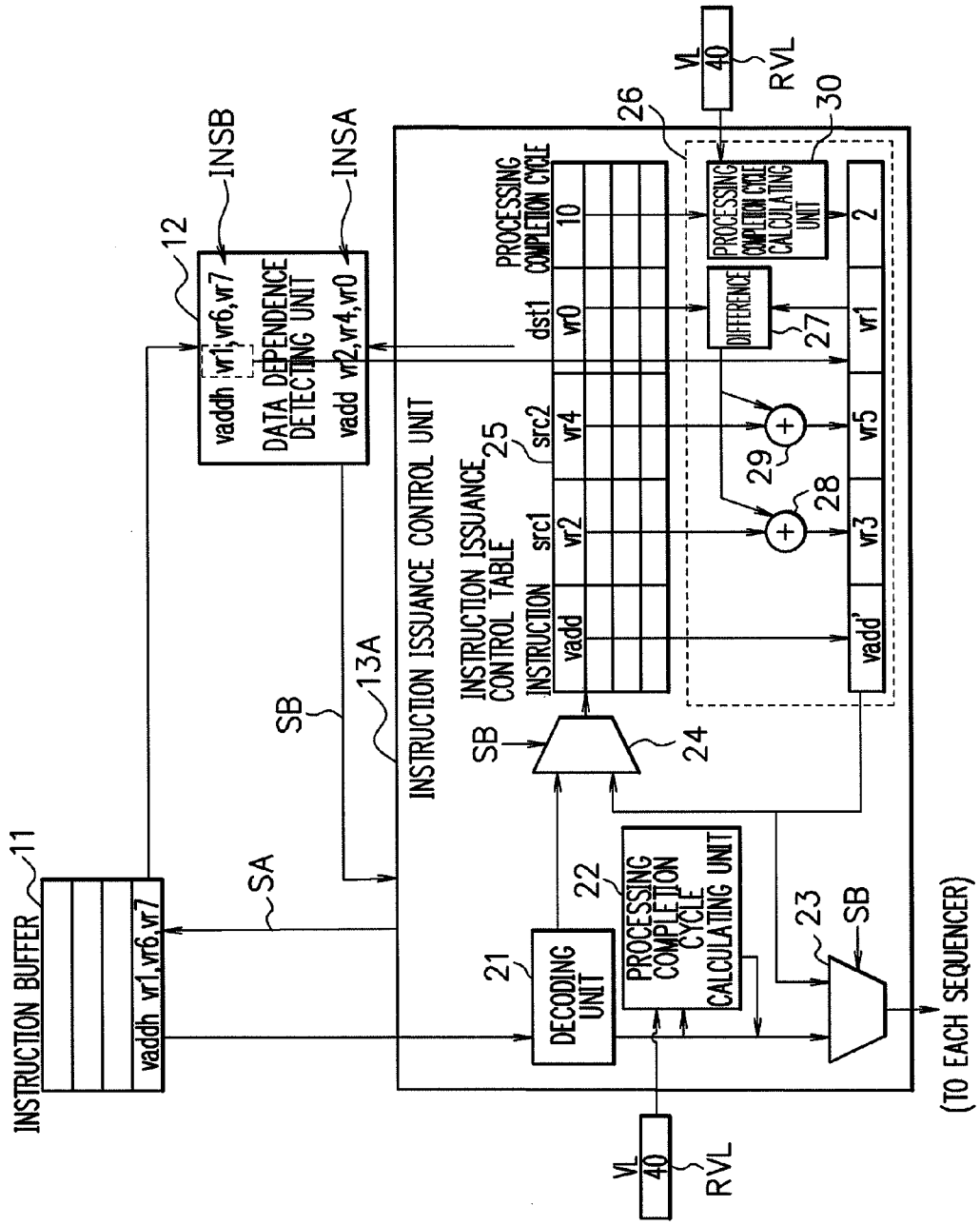
FIG. 1 is a diagram illustrating a structural example of an instruction issuance control unit in a first embodiment.

FIG. 1 is a block diagram illustrating a structural example of an instruction issuance control unit in the first embodiment. In FIG. 1, an instruction buffer 11, a data dependence detecting unit 12, and an instruction issuance control unit 13A correspond to the instruction buffer 101, the data dependence detecting unit 102, and the instruction issuance control unit 103, respectively, which are illustrated in FIG. 18.

The instruction buffer 11 stores an instruction (vector instruction) read from a storage device or the like. The data dependence detecting unit 12 determines whether or not a vector register specified by a preceding instruction INSA which is executed precedingly overlaps with a vector register specified by a succeeding instruction INSB which succeeds the preceding instruction, so as to detect a data dependence relation between the preceding instruction and the succeeding instruction.

Upon reception of an instruction stored in the instruction buffer 11 and a detection result in the data dependence detecting unit 12, the instruction issuance control unit 13A issues an instruction to an execution pipeline. The instruction issuance control unit 13A has a decoding unit 21, a first processing completion cycle calculating unit 22, multiplexer circuits 23, 24, an instruction issuance control table 25, and an instruction generating unit 26. The instruction generating unit 26 has calculating units 27, 28, 29, and a second processing completion cycle calculating unit 30.

The instruction issuance control unit 13A determines which execution pipeline a next instruction is to be issued to according to the data dependence relation and vacant states of the execution pipelines, and issues the instruction. The instruction issuance control unit 13A outputs an instruction issuance request SA to the instruction buffer 11 normally when there is a vacancy in the execution pipelines based on a detection result SB supplied from the data dependence detecting unit 12. When the next instruction is supplied from the instruction buffer 11 to the instruction issuance control unit 13A as a response to this issuance request SA, the decoding unit 21 decodes the supplied instruction. Further, the first processing completion cycle calculating unit 22 calculates an instruction processing completion cycle based on information of data word length obtained from the decoding result in the decoding unit 21 and information of vector length (VL) stored in a register RVL. Then, the decoding result in the decoding unit 21 and the processing completion cycle calculated in the first processing completion cycle calculating unit 22 are outputted to a sequencer of the execution pipeline via the multiplexer circuit 23, and calculation processing according to the instruction is executed. Further, the decoding result in the decoding unit 21 issued to the sequencer and the processing completion cycle calculated in the first processing completion cycle calculating unit 22 are registered in the instruction issuance control table 25 via the multiplexer circuit 24. Information registered in the instruction issuance control table 25 includes an instruction type, the logical number (src1, src2) of a source register, the logical number (dst1) of a destination register, and a processing completion cycle.

Figure 2A:
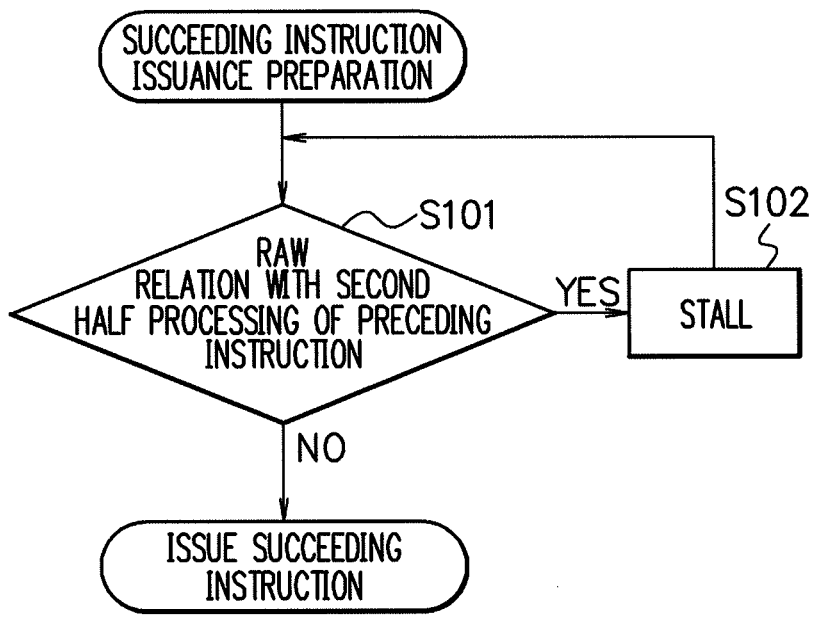
FIG. 2A is a flowchart illustrating an example of instruction issuance control by a conventional technique.

Here, for example, when the preceding instruction is a Word calculation instruction and the succeeding instruction is a Halfword calculation instruction, and a data dependence relation corresponding to the RAW hazard exists between the preceding instruction and the succeeding instruction, the conventional instruction issuance control unit performs control of instruction issuance as illustrated in FIG. 2A. When it is determined that the data dependence relation corresponding to the RAW hazard exists between the preceding instruction and the succeeding instruction (YES in S101), there is a possibility that the succeeding instruction is not issued, that is, stalled until writing in the vector register by the preceding instruction completes (S102).

Figure 2B:
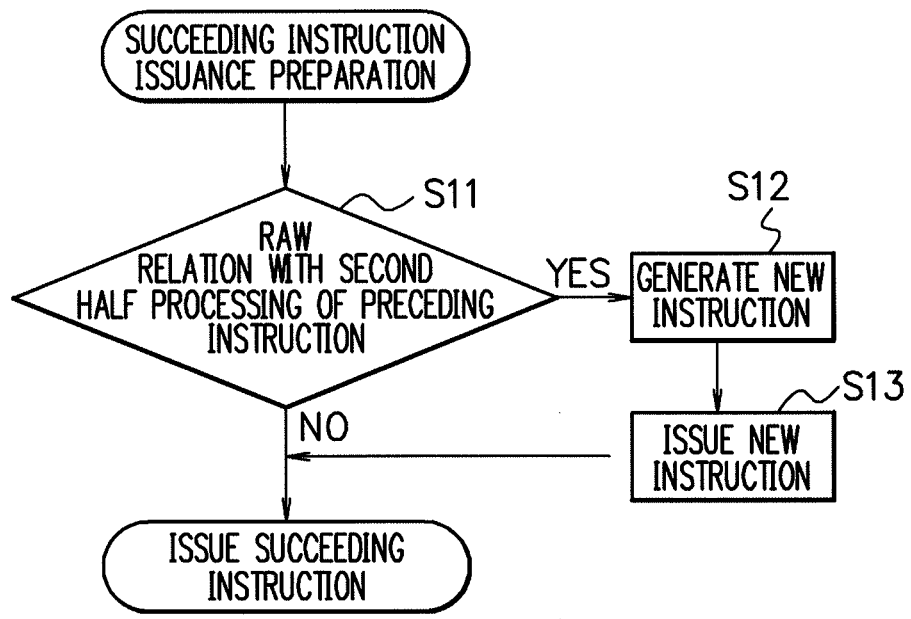
FIG. 2B is a flowchart illustrating an example of instruction issuance control by this embodiment.

On the other hand, for example, when the data dependence relation corresponding to the RAW hazard exists between the preceding Word calculation instruction and the succeeding Halfword calculation instruction, the instruction issuance control unit 13A in the first embodiment performs control to issue an instruction as illustrated in FIG. 2B. When determined that the data dependence relation corresponding to the RAW hazard exists between the preceding instruction and the succeeding instruction by the detection result SB from the data dependence detecting unit 12 (YES in S11), the instruction issuance control unit 13A generates a new instruction which is equivalent to processing of a second half in the preceding instruction (S12). Note that the processing of the second half in the preceding instruction (second half processing) in the preceding instruction is processing of writing in a vector register which has the data dependence relation corresponding to the RAW hazard with the succeeding instruction in the processing of the preceding instruction. Next, the instruction issuance control unit 13A issues the generated new instruction to an execution pipeline in a vacant state (S13), and issues a succeeding instruction to the execution pipeline in a vacant state thereafter.

Figure 3:
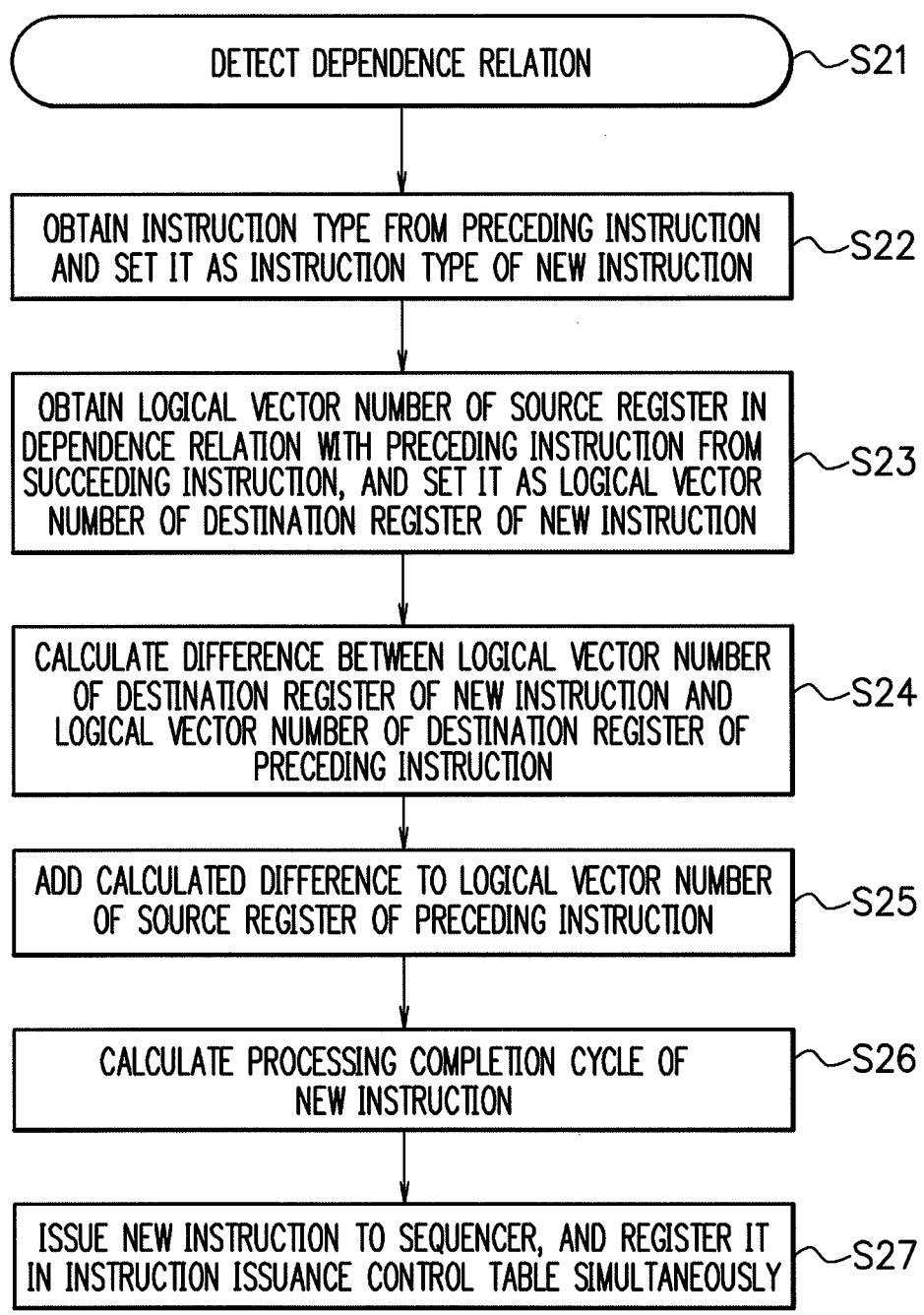
FIG. 3 is a flowchart illustrating an operation example of the instruction issuance control unit in the first embodiment.

FIG. 3 is a flowchart illustrating an operation example of the instruction issuance control unit 13A in the first embodiment. As illustrated in FIG. 3, when the data dependence relation corresponding to the RAW hazard is detected between the preceding instruction and the succeeding instruction (S21), the instruction generating unit 26 of the instruction issuance control unit 13A first obtains information of the preceding instruction from the instruction issuance control table 25. The obtained information of the preceding instruction includes the type of instruction, the logical number of the source register, the logical number of the destination register, and the processing completion cycle. The instruction generating unit 26 extracts and calculates respective pieces of information needed for the new instruction based on the obtained information of the preceding instruction and then generates the new instruction in the order of the flowchart illustrated in FIG. 3. The extraction and calculation of the respective pieces of information needed for the new instruction will be described below based on the flowchart of FIG. 3.

The instruction generating unit 26 sets the obtained instruction type of the preceding instruction as the instruction type of the new instruction (S22). Next, the instruction generating unit 26 obtains the logical number of the source register in the data dependence relation with the preceding instruction from the succeeding instruction existing in the data dependence detecting unit 12, and sets the logical number as the logical number of the destination register of the new instruction (S23). Next, the instruction generating unit 26 calculates in the calculating unit 27 a difference between the logical number of the destination register of the new instruction and the logical number of the destination register of the preceding instruction (S24). Subsequently, the instruction generating unit 26 adds the difference value calculated in the calculating unit 27 to the logical number of the source register of the preceding instruction in the calculating units 28, 29, and sets a result obtained by the addition as the logical number of the source register of the new instruction (S25). Thus, the logical number of the source register and the logical number of the destination register of the new instruction are obtained.

Next, the instruction generating unit 26 calculates the processing completion cycle of the new instruction in the second processing completion cycle calculating unit 30 (S26). In this calculation processing, first, the vector length (VL) processed in a first half in the preceding instruction is calculated based on information of the vector length (VL) set in the register RVL. The vector length (VL) processed in the first half in the preceding instruction is calculated by CEILPOW2(VL)/2. Here, CEILPOW2(X) is a function which takes the minimum power of two larger than or equal to X. For example, CEILPOW2(32)=32, and CEILPOW2(40)=64. Then, the processing completion cycle of processing of the first half in the preceding instruction is calculated by dividing the vector length (VL) processed in the first half in the calculated preceding instruction by the number of registers processed in one cycle. The number of registers processed in one cycle in this embodiment is, for example, 4 in the case where the data word length is Word, or 8 in the case where the data word length is Halfword. Subsequently, the processing completion cycle of the new instruction is calculated by subtracting the processing completion cycle of processing of the first half in the preceding instruction from the processing completion cycle of the preceding instruction.

Next, the instruction issuance control unit 13A outputs the new instruction and the processing completion cycle generated in the instruction generating unit 26 to the sequencer of the execution pipeline via the multiplexer circuit 23, and registers them in the instruction issuance control table 25 via the multiplexer circuit 24 (S27). Note that selection of the instruction read from the instruction buffer 11 and the generated new instruction by the multiplexer circuits 23, 24 is determined according to presence of the detection result SB, that is, the data dependence relation from the data dependence detecting unit 12.

Thus, when the data dependence relation corresponding to the RAW hazard exists between the preceding instruction and the succeeding instruction, the new instruction generated in the instruction generating unit 26 is issued before the succeeding instruction, and the succeeding instruction is issued thereafter. The vector register read by the succeeding instruction is written by the generated new instruction, thereby assuring a processing result. Therefore, the RAW hazard is avoided between the preceding instruction and the succeeding instruction without making a stall occur which occurred conventionally, thereby enabling to issue the succeeding instruction efficiently.

For example, FIGS. 4A and 4B illustrate a processing operation example of the case where the vector length (VL) is 32, the preceding instruction is a Word addition instruction "vadd vr2, vr4, vr0", and the succeeding instruction is a Halfword addition instruction "vaddh vr1, vr6, vr7". In processing by the preceding instruction "vadd vr2, vr4, vr0" and processing by the succeeding instruction "vaddh vr1, vr6, vr7", the data dependence relation corresponding to the RAW hazard exists with respect to the vector registers vr[32] to vr[63] with the physical numbers 32 to 63.

As illustrated in FIG. 4A, in the general vector processing device, for example, when the preceding instruction "vadd vr2, vr4, vr0" is issued to the pipeline A in the cycle 1, a processing result is written in the vector registers vr[32] to vr[39] with the physical numbers 32 to 39 in the cycle 5. Therefore, in the cycle 2 to the cycle 5, a stall due to the RAW hazard is made to occur, and the succeeding instruction "vaddh vr1, vr6, vr7" for reading data from the vector registers vr[32] to vr[39] with the physical numbers 32 to 39 in the beginning cycle is issued in the cycle 6.

On the other hand, as illustrated in FIG. 4B, in the vector processing device in the first embodiment, for example, the preceding instruction "vadd vr2, vr4, vr0" is issued to the pipeline A in the cycle 1, and this instruction is executed in the pipeline A. Since the data dependence relation corresponding to the RAW hazard exists between the preceding instruction and the succeeding instruction, the instruction issuance control unit 13A generates a new instruction "vadd' vr3, vr5, vr1" which is equivalent to processing of the second half in the preceding instruction, and issues the new instruction to the pipeline B in the cycle 2. Note that the new instruction is denoted as vadd' for indicating that it is a generated instruction, but the calculation thereof itself is the same as that of vadd (the same applies thereafter). Thus, the same processing as the processing performed by the preceding instruction "vadd vr2, vr4, vr0" is executed on the vector registers vr[32] to vr[63] with the physical numbers 32 to 63 from the cycle 2. Accordingly, without waiting for the processing by the preceding instruction "vadd vr2, vr4, vr0", the succeeding instruction "vaddh vr1, vr6, vr7" can be issued to the pipeline C in the succeeding cycle 3, and this instruction can be executed.

Further, for example, FIGS. 5A and 5B illustrate a processing operation example of the case where the vector length (VL) is 40, the preceding instruction is a Word addition instruction "vadd vr2, vr4, vr0", and the succeeding instruction is a Halfword addition instruction "vaddh vr1, vr6, vr7". In processing by the preceding instruction "vadd vr2, vr4, vr0" and processing by the succeeding instruction "vaddh vr1, vr6, vr7", the data dependence relation corresponding to the RAW hazard exists with respect to the vector registers vr[64] to vr[79] with the physical numbers 64 to 79.

As illustrated in FIG. 5A, in the general vector processing device, for example, when the preceding instruction "vadd vr2, vr4, vr0" is issued to the pipeline A in the cycle 1, a processing result is written in the vector registers vr[64] to vr[71] with the physical numbers 64 to 71 in the cycle 9. Therefore, in the cycle 2 to the cycle 9, a stall due to the RAW hazard is made to occur, and the succeeding instruction "vaddh vr1, vr6, vr7" for reading data from the vector registers vr[64] to vr[71] with the physical numbers 64 to 71 in the beginning cycle is issued in the cycle 10.

On the other hand, as illustrated in FIG. 5B, in the vector processing device in the first embodiment, for example, the preceding instruction "vadd vr2, vr4, vr0" is issued to the pipeline A in the cycle 1, and this instruction is executed in the pipeline A. Since the data dependence relation corresponding to the RAW hazard exists between the preceding instruction and the succeeding instruction, the instruction issuance control unit 13A generates a new instruction "vadd' vr3, vr5, vr1" which is equivalent to processing of the second half in the preceding instruction, and issues the new instruction to the pipeline B in the cycle 2. Thus, the same processing as the processing performed by the preceding instruction "vadd vr2, vr4, vr0" is executed on the vector registers vr[64] to vr[79] with the physical numbers 64 to 79 from the cycle 2. Accordingly, without waiting for the processing by the preceding instruction "vadd vr2, vr4, vr0", the succeeding instruction "vaddh vr1, vr6, vr7" can be issued to the pipeline C in the succeeding cycle 3, and this instruction can be executed.

Note that in FIGS. 4A and 4B and FIGS. 5A and 5B, for the instruction "vadd vr2, vr4, vr0", the physical number (head value) of the vector register vr0 with the logical number 0 which is a destination register is illustrated in every cycle. Further, for the instruction "vadd' vr3, vr5, vr1", the physical number (head value) of the vector register vr1 with the logical number 1 which is a destination register is illustrated in every cycle. Further, for the instruction "vaddh vr1, vr6, vr7", the physical number (head value) of the vector register vr1 with the logical number 1 which is a source register is illustrated in every cycle.

The example of the case where the preceding instruction is the Word calculation instruction and the succeeding instruction is the Halfword calculation instruction has been illustrated, but the case where the preceding instruction and the succeeding instruction are both the Word calculation instruction can be processed similarly. For example, FIGS. 6A and 6B illustrate a processing operation example of the case where the vector length (VL) is 32, the preceding instruction is a Word addition instruction "vadd vr4, vr6, vr0", and the succeeding instruction is a Word addition instruction "vadd vr1, vr8, vr10". In processing by the preceding instruction "vadd vr4, vr6, vr0" and processing by the succeeding instruction "vadd vr1, vr8, vr10", the data dependence relation corresponding to the RAW hazard exists with respect to the vector registers vr[32] to vr[63] with the physical numbers 32 to 63.

As illustrated in FIG. 6A, in the general vector processing device, for example, when the preceding instruction "vadd vr4, vr6, vr0" is issued to the pipeline A in the cycle 1, a processing result is written in the vector registers vr[32] to vr[39] with the physical numbers 32 to 39 in the cycle 5. Therefore, in the cycle 2 to the cycle 5, a stall due to the RAW hazard is made to occur, and the succeeding instruction "vadd vr1, vr8, vr10" for reading data from the vector registers vr[32] to vr[39] with the physical numbers 32 to 39 in the beginning cycle is issued in the cycle 6.

On the other hand, as illustrated in FIG. 6B, in the vector processing device in the first embodiment, for example, the preceding instruction "vadd vr4, vr6, vr0" is issued to the pipeline A in the cycle 1, and this instruction is executed in the pipeline A. Since the data dependence relation corresponding to the RAW hazard exists between the preceding instruction and the succeeding instruction, the instruction issuance control unit 13A generates a new instruction "vadd' vr5, vr7, vr1" which is equivalent to processing of the second half in the preceding instruction, and issues the new instruction to the pipeline B in the cycle 2. Thus, the same processing as the processing performed by the preceding instruction "vadd vr4, vr6, vr0" is executed on the vector registers vr[32] to vr[63] with the physical numbers 32 to 63 from the cycle 2. Accordingly, without waiting for the processing by the preceding instruction "vadd vr4, vr6, vr0", the succeeding instruction "vadd vr1, vr8, vr10" can be issued to the pipeline C in the succeeding cycle 3, and this instruction can be executed.

Further, for example, FIGS. 7A and 7B illustrate a processing operation example of the case where the vector length (VL) is 40, the preceding instruction is a Word addition instruction "vadd vr4, vr6, vr0", and the succeeding instruction is a Word addition instruction "vadd vr1, vr8, vr10". In processing by the preceding instruction "vadd vr4, vr6, vr0" and processing by the succeeding instruction "vadd vr1, vr8, vr10", the data dependence relation corresponding to the RAW hazard exists with respect to the vector registers vr[64] to vr[79] with the physical numbers 64 to 79.

As illustrated in FIG. 7A, in the general vector processing device, for example, when the preceding instruction "vadd vr4, vr6, vr0" is issued to the pipeline A in the cycle 1, a processing result is written in the vector registers vr[64] to vr[71] with the physical numbers 64 to 71 in the cycle 9. Therefore, in the cycle 2 to the cycle 9, a stall due to the RAW hazard is made to occur, and the succeeding instruction "vadd vr1, vr8, vr10" for reading data from the vector registers vr[64] to vr[71] with the physical numbers 64 to 71 in the beginning cycle is issued in the cycle 10.

On the other hand, as illustrated in FIG. 7B, in the vector processing device in the first embodiment, for example, the preceding instruction "vadd vr4, vr6, vr0" is issued to the pipeline A in the cycle 1, and this instruction is executed in the pipeline A. Since the data dependence relation corresponding to the RAW hazard exists between the preceding instruction and the succeeding instruction, the instruction issuance control unit 13A generates a new instruction "vadd' vr5, vr7, vr1" which is equivalent to processing of the second half in the preceding instruction, and issues the new instruction to the pipeline B in the cycle 2. Thus, the same processing as the processing performed by the preceding instruction "vadd vr4, vr6, vr0" is executed on the vector registers vr[64] to vr[79] with the physical numbers 64 to 79 from the cycle 2. Accordingly, without waiting for the processing by the preceding instruction "vadd vr4, vr6, vr0", the succeeding instruction "vadd vr1, vr8, vr10" can be issued to the pipeline C in the succeeding cycle 3, and this instruction can be executed.

Note that in FIGS. 6A and 6B and FIGS. 7A and 7B, for the instruction "vadd vr4, vr6, vr0", the physical number (head value) of the vector register vr0 with the logical number 0 which is a destination register is illustrated in every cycle. Further, for the instruction "vadd' vr5, vr7, vr1", the physical number (head value) of the vector register vr1 with the logical number 1 which is a destination register is illustrated in every cycle. Further, for the instruction "vadd vr1, vr8, vr10", the physical number (head value) of the vector register vr1 with the logical number 1 which is a source register is illustrated in every cycle.

Second Embodiment

Next, a second embodiment will be described.

By the vector processing device in the first embodiment, the RAW hazard can be avoided between the preceding instruction and the succeeding instruction. However, the processing of the second half in the preceding instruction may be omitted since it is executed by the generated new instruction. Further, in order to allow avoiding the WAR hazard between the preceding instruction and the succeeding instruction, it is to perform control to prohibit execution of processing of the second half in the preceding instruction, so as to assure a processing result.

In a vector processing device in the second embodiment which will be described below, when a new instruction equivalent to the processing of the second half in the preceding instruction is issued, the processing completion cycle of the preceding instruction is changed after the new instruction is issued, so as to stop the processing of the second half in the preceding instruction.

Figure 8:
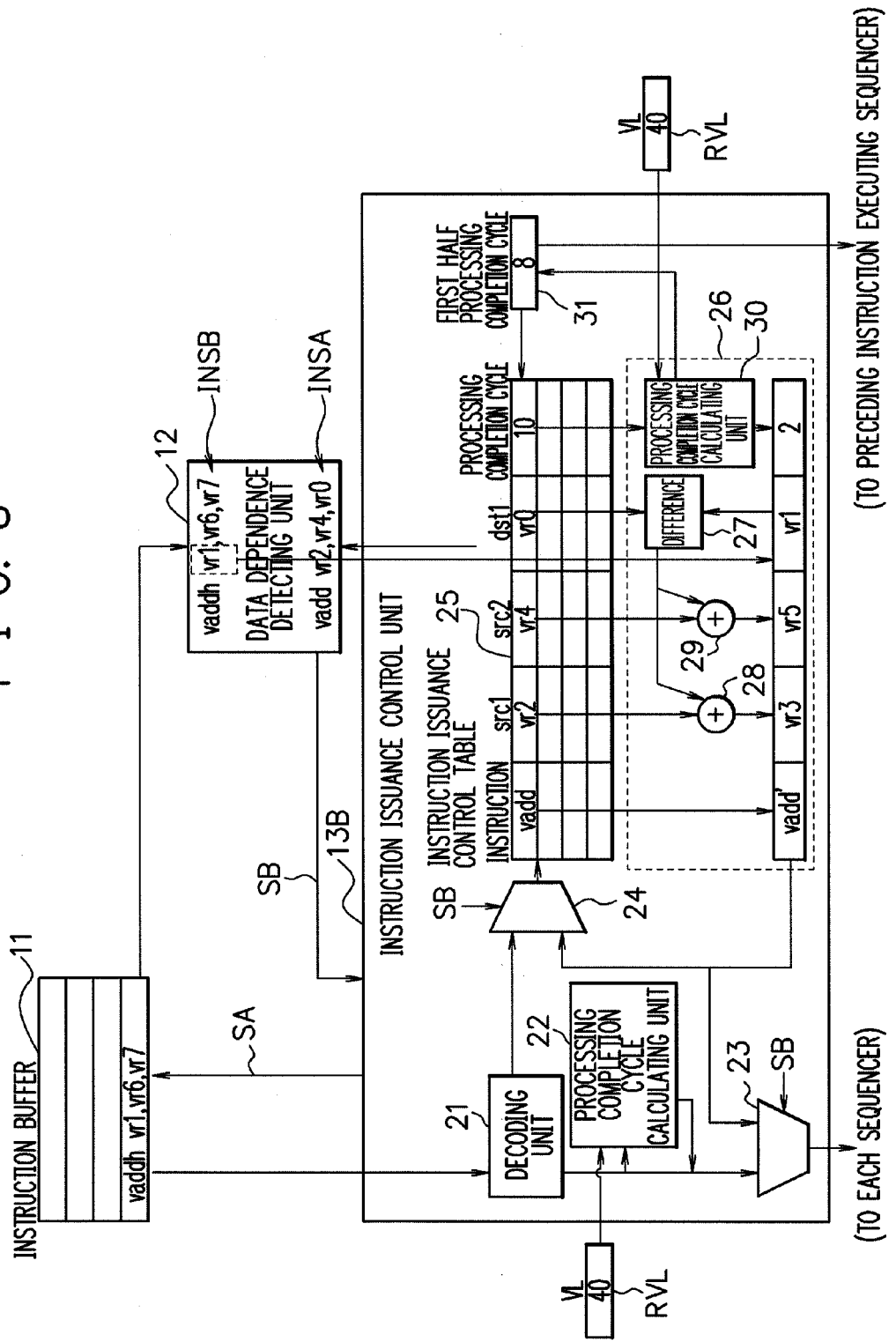
FIG. 8 is a diagram illustrating a structural example of an instruction issuance control unit in a second embodiment.

FIG. 8 is a block diagram illustrating a structural example of an instruction issuance control unit in the second embodiment. In this FIG. 8, components and the like having the same functions as the components and the like illustrated in FIG. 1 are denoted by the same numerals, and duplicated descriptions are omitted. In FIG. 8, an instruction buffer 11, a data dependence detecting unit 12, and an instruction issuance control unit 13B correspond to the instruction buffer 101, the data dependence detecting unit 102, and the instruction issuance control unit 103, respectively, which are illustrated in FIG. 18.

The instruction issuance control unit 13B in the second embodiment has a first half processing completion cycle changing unit 31 in addition to the decoding unit 21, the first processing completion cycle calculating unit 22, the multiplexer circuits 23, 24, the instruction issuance control table 25, and the instruction generating unit 26. The first half processing completion cycle changing unit 31 receives a processing completion cycle of processing of a first half in a preceding instruction calculated in the second processing completion cycle calculating unit 30. The first half processing completion cycle changing unit 31 outputs the processing completion cycle of processing of the first half in the preceding instruction to the sequencer of the execution pipeline executing the preceding instruction, and registers the processing completion cycle in the instruction issuance control table 25.

For example, the first half processing completion cycle changing unit 31 places the processing completion cycle of processing of the first half in the preceding instruction on an enable signal, and outputs the enable signal to the sequencer of the execution pipeline executing the preceding instruction. Upon reception of the enable signal from the instruction issuance control unit 13B, the sequencer overwrites the processing completion cycle of processing of the first half on an already inputted processing completion cycle, and executes processing up to the overwritten cycle, thereby stopping processing of the second half.

Figure 9:
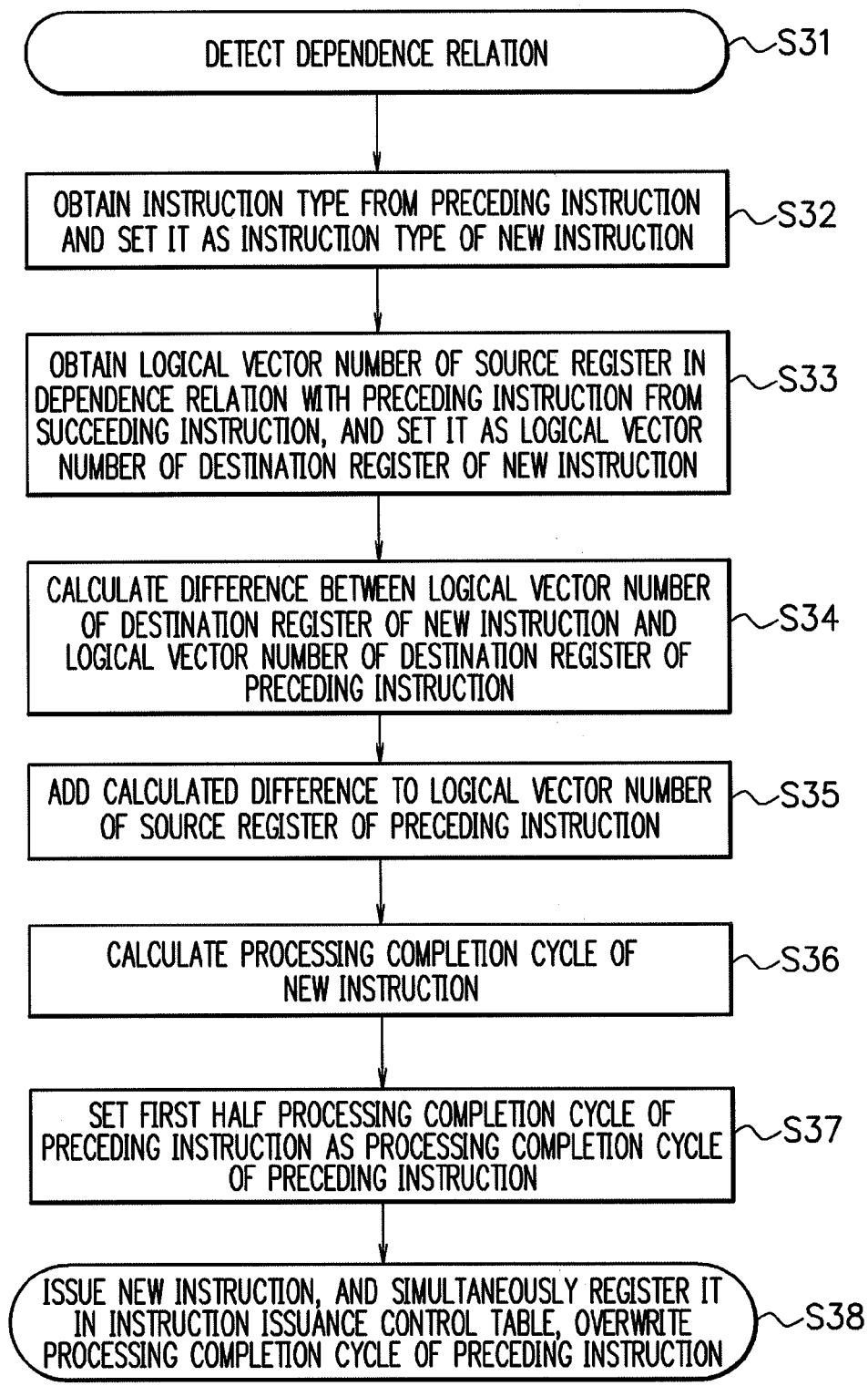
FIG. 9 is a flowchart illustrating an operation example of the instruction issuance control unit in the second embodiment.

Operation of the instruction issuance control unit 13B in the second embodiment is basically similar to operation of the instruction issuance control unit 13A in the first embodiment, but is different in operation when a data dependence relation corresponding to the RAW hazard or the WAR hazard is detected between the preceding instruction and the succeeding instruction. FIG. 9 is a flowchart illustrating an operation example of the instruction issuance control unit 13B in the second embodiment. When the data dependence relation corresponding to the RAW hazard or the WAR hazard is detected between the preceding instruction and the succeeding instruction (S31), processing of step S32 and thereafter is executed. Processing of step S32 to step S36 corresponds to processing of step S22 to step S26 in the first embodiment illustrated in FIG. 3.

Note that when the data dependence relation corresponding to the WAR hazard is detected, in step S33, the instruction generating unit 26 obtains from the succeeding instruction the logical number of a destination register which is in the data dependence relation with the preceding instruction, and sets the logical number as the logical number of a first source register of a new instruction. Further, in step S34, the instruction generating unit 26 calculates a difference between the logical number of the first source register of the new instruction and the logical number of a first source register in the data dependence relation with the succeeding instruction in the preceding instruction. Then, in step S35, the instruction generating unit 26 adds the calculated difference value to the logical number of a second source register and the logical number of a destination register of the preceding instruction, and sets the obtained result as the logical number of a second source register and the logical number of a destination register of the new instruction.

In step S37, the instruction generating unit 26 and the first half processing completion cycle changing unit 31 sets the processing completion cycle of processing of the first half in the preceding instruction calculated in step S36 as the processing completion cycle of the preceding instruction. Next, in step S38, the instruction issuance control unit 13B outputs the new instruction and the processing completion cycle generated in the instruction generating unit 26 to the sequencer of the execution pipeline via the multiplexer circuit 23, and registers them in the instruction issuance control table 25 via the multiplexer circuit 24. Further, the first half processing completion cycle changing unit 31 outputs the processing completion cycle of the preceding instruction to the sequencer of the execution pipeline executing the preceding instruction and registers it in the instruction issuance control table 25.

Thus, when the data dependence relation corresponding to the RAW hazard or the WAR hazard exists between the preceding instruction and the succeeding instruction, the new instruction generated in the instruction generating unit 26 is issued before the succeeding instruction, and the succeeding instruction is issued thereafter. Further, the processing completion cycle of the preceding instruction is changed to the processing completion cycle of processing of the first half in the preceding instruction. For example, when the data dependence relation corresponding to the RAW hazard exists, the vector register read by the succeeding instruction is written by the generated new instruction, thereby assuring a processing result. Moreover, it is possible to stop useless writing processing in the vector register by the preceding instruction. Further, for example, when the data dependence relation corresponding to the WAR hazard exists, the vector register written by the succeeding instruction is read earlier by the generated new instruction, thereby assuring a processing result. Moreover, a processing result is assured by stopping processing of the second half in the preceding instruction. Therefore, the RAW hazard and the WAR hazard can be avoided between the preceding instruction and the succeeding instruction without making a stall occur which occurred conventionally, thereby enabling to issue the succeeding instruction efficiently. Further, the execution pipeline executing the preceding instruction by stopping unnecessary processing by the preceding instruction can be released quickly, thereby enabling to issue an instruction efficiently.

For example, FIGS. 10A and 10B illustrate a processing operation example of the case where the vector length (VL) is 32, the preceding instruction is a Word addition instruction "vadd vr2, vr4, vr0", and the succeeding instruction is a Halfword addition instruction "vaddh vr1, vr6, vr7". In processing by the preceding instruction "vadd vr2, vr4, vr0" and processing by the succeeding instruction "vaddh vr1, vr6, vr7", the data dependence relation corresponding to the RAW hazard exists with respect to the vector registers vr[32] to vr[63] with the physical numbers 32 to 63.

As illustrated in FIG. 10A, processing operation in the general vector processing device is similar to the processing operation illustrated in FIG. 4A. That is, in the cycle 2 to the cycle 5, a stall due to the RAW hazard is made to occur, and the succeeding instruction "vaddh vr1, vr6, vr7" is issued in the cycle 6.

On the other hand, as illustrated in FIG. 10B, in the vector processing device in the second embodiment, for example, the preceding instruction "vadd vr2, vr4, vr0" is issued to the pipeline A in the cycle 1, and this instruction is executed in the pipeline A. Since the data dependence relation corresponding to the RAW hazard exists between the preceding instruction and the succeeding instruction, the instruction issuance control unit 13B generates a new instruction "vadd' vr3, vr5, vr1" which is equivalent to processing of the second half in the preceding instruction, and issues the new instruction to the pipeline B in the cycle 2. Thus, the same processing as the processing performed by the preceding instruction "vadd vr2, vr4, vr0" is executed on the vector registers vr[32] to vr[63] with the physical numbers 32 to 63 from the cycle 2. Accordingly, the succeeding instruction "vaddh vr1, vr6, vr7" can be issued to the pipeline C in the cycle 3, and this instruction can be executed. Further, the processing related to the vector registers vr[32] to vr[63] with the physical numbers 32 to 63 by the preceding instruction "vadd vr2, vr4, vr0" is unnecessary, and thus the processing of the preceding instruction "vadd vr2, vr4, vr0" is completed in the cycle 4 and the pipeline A is released.

Further, for example, FIGS. 11A and 11B illustrate a processing operation example of the case where the vector length (VL) is 40, the preceding instruction is a Word addition instruction "vadd vr2, vr4, vr0", and the succeeding instruction is a Halfword addition instruction "vaddh vr1, vr6, vr7". In processing by the preceding instruction "vadd vr2, vr4, vr0" and processing by the succeeding instruction "vaddh vr1, vr6, vr7", the data dependence relation corresponding to the RAW hazard exists with respect to the vector registers vr[64] to vr[79] with the physical numbers 64 to 79.

As illustrated in FIG. 11A, processing operation in the general vector processing device is similar to the processing operation illustrated in FIG. 5A. That is, in the cycle 2 to the cycle 9, a stall due to the RAW hazard is made to occur, and the succeeding instruction "vaddh vr1, vr6, vr7" is issued in the cycle 10.

On the other hand, as illustrated in FIG. 11B, in the vector processing device in the second embodiment, for example, the preceding instruction "vadd vr2, vr4, vr0" is issued to the pipeline A in the cycle 1, and this instruction is executed in the pipeline A. Since the data dependence relation corresponding to the RAW hazard exists between the preceding instruction and the succeeding instruction, the instruction issuance control unit 13B generates a new instruction "vadd' vr3, vr5, vr1" which is equivalent to processing of the second half in the preceding instruction, and issues the new instruction to the pipeline B in the cycle 2. Thus, the same processing as the processing performed by the preceding instruction "vadd vr2, vr4, vr0" is executed on the vector registers vr[64] to vr[79] with the physical numbers 64 to 79 from the cycle 2. Accordingly, the succeeding instruction "vaddh vr1, vr6, vr7" can be issued to the pipeline C in the cycle 3, and this instruction can be executed. Further, the processing related to the vector registers vr[64] to vr[79] with the physical numbers 64 to 79 by the preceding instruction "vadd vr2, vr4, vr0" is unnecessary, and thus the processing of the preceding instruction "vadd vr2, vr4, vr0" is completed in the cycle 8 and the pipeline A is released.

Note that in FIGS. 10A and 10B and FIGS. 11A and 11B, for the instruction "vadd vr2, vr4, vr0", the physical number (head value) of the vector register vr0 with the logical number 0 which is a destination register is illustrated in every cycle. Further, for the instruction "vadd' vr3, vr5, vr1", the physical number (head value) of the vector register vr1 with the logical number 1 which is a destination register is illustrated in every cycle. Further, for the instruction "vaddh vr1, vr6, vr7", the physical number (head value) of the vector register vr1 with the logical number 1 which is a source register is illustrated in every cycle.

The case where the preceding instruction and the succeeding instruction are both the Word calculation instruction can be processed similarly. For example, FIGS. 12A and 12B illustrate a processing operation example of the case where the vector length (VL) is 32, the preceding instruction is a Word addition instruction "vadd vr4, vr6, vr0", and the succeeding instruction is a Word addition instruction "vadd vr1, vr8, vr10". In processing by the preceding instruction "vadd vr4, vr6, vr0" and processing by the succeeding instruction "vadd vr1, vr8, vr10", the data dependence relation corresponding to the RAW hazard exists with respect to the vector registers vr[32] to vr[63] with the physical numbers 32 to 63.

As illustrated in FIG. 12A, processing operation in the general vector processing device is similar to the processing operation illustrated in FIG. 6A. That is, in the cycle 2 to the cycle 5, a stall due to the RAW hazard is made to occur, and the succeeding instruction "vadd vr1, vr8, vr10" is issued in the cycle 6.

On the other hand, as illustrated in FIG. 12B, in the vector processing device in the second embodiment, for example, the preceding instruction "vadd vr4, vr6, vr0" is issued to the pipeline A in the cycle 1, and this instruction is executed in the pipeline A. Since the data dependence relation corresponding to the RAW hazard exists between the preceding instruction and the succeeding instruction, the instruction issuance control unit 13B generates a new instruction "vadd' vr5, vr7, vr1" which is equivalent to processing of the second half in the preceding instruction, and issues the new instruction to the pipeline B in the cycle 2. Thus, the same processing as the processing performed by the preceding instruction "vadd vr4, vr6, vr0" is executed on the vector registers vr[32] to vr[63] with the physical numbers 32 to 63 from the cycle 2. Accordingly, the succeeding instruction "vadd vr1, vr8, vr10" can be issued to the pipeline C in the cycle 3, and this instruction can be executed. Further, the processing related to the vector registers vr[32] to vr[63] with the physical numbers 32 to 63 by the preceding instruction "vadd vr4, vr6, vr0" is unnecessary, and thus the processing of the preceding instruction "vadd vr4, vr6, vr0" is completed in the cycle 4 and the pipeline A is released.

Further, for example, FIGS. 13A and 13B illustrate a processing operation example of the case where the vector length (VL) is 40, the preceding instruction is a Word addition instruction "vadd vr4, vr6, vr0", and the succeeding instruction is a Word addition instruction "vadd vr1, vr8, vr10". In processing by the preceding instruction "vadd vr4, vr6, vr0" and processing by the succeeding instruction "vadd vr1, vr8, vr10", the data dependence relation corresponding to the RAW hazard exists with respect to the vector registers vr[64] to vr[79] with the physical numbers 64 to 79.

As illustrated in FIG. 13A, processing operation in the general vector processing device is similar to the processing operation illustrated in FIG. 7A. That is, in the cycle 2 to the cycle 9, a stall due to the RAW hazard is made to occur, and the succeeding instruction "vadd vr1, vr8, vr10" is issued in the cycle 10.

On the other hand, as illustrated in FIG. 13B, in the vector processing device in the second embodiment, for example, the preceding instruction "vadd vr4, vr6, vr0" is issued to the pipeline A in the cycle 1, and this instruction is executed in the pipeline A. Since the data dependence relation corresponding to the RAW hazard exists between the preceding instruction and the succeeding instruction, the instruction issuance control unit 13B generates a new instruction "vadd' vr5, vr7, vr1" which is equivalent to processing of the second half in the preceding instruction, and issues the new instruction to the pipeline B in the cycle 2. Thus, the same processing as the processing performed by the preceding instruction "vadd vr4, vr6, vr0" is executed on the vector registers vr[64] to vr[79] with the physical numbers 64 to 79 from the cycle 2. Accordingly, the succeeding instruction "vadd vr1, vr8, vr10" can be issued to the pipeline C in the cycle 3, and this instruction can be executed. Further, the processing related to the vector registers vr[64] to vr[79] with the physical numbers 64 to 79 by the preceding instruction "vadd vr4, vr6, vr0" is unnecessary, and thus the processing of the preceding instruction "vadd vr4, vr6, vr0" is completed in the cycle 8 and the pipeline A is released.

Note that in FIGS. 12A and 12B and FIGS. 13A and 13B, for the instruction "vadd vr4, vr6, vr0", the physical number (head value) of the vector register vr0 with the logical number 0 which is a destination register is illustrated in every cycle. Further, for the instruction "vadd' vr5, vr7, vr1", the physical number (head value) of the vector register vr1 with the logical number 1 which is a destination register is illustrated in every cycle. Further, for the instruction "vadd vr1, vr8, vr10", the physical number (head value) of the vector register vr1 with the logical number 1 which is a source register is illustrated in every cycle.

Next, an example of the case where the data dependence relation corresponding to the WAR hazard exists between the preceding instruction and the succeeding instruction will be illustrated. For example, FIGS. 14A and 14B illustrate a processing operation example of the case where the vector length (VL) is 32, the preceding instruction is a Word addition instruction "vadd vr0, vr4, vr2", and the succeeding instruction is a Halfword addition instruction "vaddh vr6, vr7, vr1". In processing by the preceding instruction "vadd vr0, vr4, vr2" and processing by the succeeding instruction "vaddh vr6, vr7, vr1", the data dependence relation corresponding to the WAR hazard exists with respect to the vector registers vr[32] to vr[63] with the physical numbers 32 to 63.

As illustrated in FIG. 14A, in the general vector processing device, for example, when the preceding instruction "vadd vr0, vr4, vr2" is issued to the pipeline A in the cycle 1, data are read from the vector registers vr[32] to vr[39] with the physical numbers 32 to 39 in the cycle 5. Therefore, in the cycle 2 to the cycle 5, a stall due to the WAR hazard is made to occur, and the succeeding instruction "vaddh vr6, vr7, vr1" for writing a processing result in the vector registers vr[32] to vr[39] with the physical numbers 32 to 39 in the beginning cycle is issued in the cycle 6.

On the other hand, as illustrated in FIG. 14B, in the vector processing device in the second embodiment, for example, the preceding instruction "vadd vr0, vr4, vr2" is issued to the pipeline A in the cycle 1, and this instruction is executed in the pipeline A. Since the data dependence relation corresponding to the WAR hazard exists between the preceding instruction and the succeeding instruction, the instruction issuance control unit 13B generates a new instruction "vadd' vr1, vr5, vr3" which is equivalent to processing of the second half in the preceding instruction, and issues the new instruction to the pipeline B in the cycle 2. Thus, the same processing as the processing performed by the preceding instruction "vadd vr0, vr4, vr2" is executed on the vector registers vr[32] to vr[63] with the physical numbers 32 to 63 from the cycle 2. Accordingly, the succeeding instruction "vaddh vr6, vr7, vr1" can be issued to the pipeline C in the cycle 3, and this instruction can be executed. Further, the processing related to the vector registers vr[32] to vr[63] with the physical numbers 32 to 63 by the preceding instruction "vadd vr0, vr4, vr2" is unnecessary, and thus the processing of the preceding instruction "vadd vr0, vr4, vr2" is completed in the cycle 4 and the pipeline A is released.

Further, for example, FIGS. 15A and 15B illustrate a processing operation example of the case where the vector length (VL) is 40, the preceding instruction is a Word addition instruction "vadd vr0, vr4, vr2", and the succeeding instruction is a Halfword addition instruction "vaddh vr6, vr7, vr1". In processing by the preceding instruction "vadd vr0, vr4, vr2" and processing by the succeeding instruction "vaddh vr6, vr7, vr1", the data dependence relation corresponding to the WAR hazard exists with respect to the vector registers vr[64] to vr[79] with the physical numbers 64 to 79.

As illustrated in FIG. 15A, in the general vector processing device, for example, when the preceding instruction "vadd vr0, vr4, vr2" is issued to the pipeline A in the cycle 1, data are read from the vector registers vr[64] to vr[71] with the physical numbers 64 to 71 in the cycle 9. Therefore, in the cycle 2 to the cycle 9, a stall due to the WAR hazard is made to occur, and the succeeding instruction "vaddh vr6, vr7, vr1" for writing a processing result in the vector registers vr[64] to vr[71] with the physical numbers 64 to 71 in the beginning cycle is issued in the cycle 10.

On the other hand, as illustrated in FIG. 15B, in the vector processing device in the second embodiment, for example, the preceding instruction "vadd vr0, vr4, vr2" is issued to the pipeline A in the cycle 1, and this instruction is executed in the pipeline A. Since the data dependence relation corresponding to the WAR hazard exists between the preceding instruction and the succeeding instruction, the instruction issuance control unit 13B generates a new instruction "vadd' vr1, vr5, vr3" which is equivalent to processing of the second half in the preceding instruction, and issues the new instruction to the pipeline B in the cycle 2. Thus, the same processing as the processing performed by the preceding instruction "vadd vr0, vr4, vr2" is executed on the vector registers vr[64] to vr[79] with the physical numbers 64 to 79 from the cycle 2. Accordingly, the succeeding instruction "vaddh vr6, vr7, vr1" can be issued to the pipeline C in the cycle 3, and this instruction can be executed. Further, the processing related to the vector registers vr[64] to vr[79] with the physical numbers 64 to 79 by the preceding instruction "vadd vr0, vr4, vr2" is unnecessary, and thus the processing of the preceding instruction "vadd vr0, vr4, vr2" is completed in the cycle 8 and the pipeline A is released.

Note that in FIGS. 14A and 14B and FIGS. 15A and 15B, for the instruction "vadd vr0, vr4, vr2", the physical number (head value) of the vector register vr0 with the logical number 0 which is a source register is illustrated in every cycle. Further, for the instruction "vadd' vr1, vr5, vr3", the physical number (head value) of the vector register vr1 with the logical number 1 which is a source register is illustrated in every cycle. Further, for the instruction "vaddh vr6, vr7, vr1", the physical number (head value) of the vector register vr1 with the logical number 1 which is a destination register is illustrated in every cycle.

The case where the preceding instruction and the succeeding instruction are both the Word calculation instruction can be processed similarly. For example, FIGS. 16A and 16B illustrate a processing operation example of the case where the vector length (VL) is 32, the preceding instruction is a Word addition instruction "vadd vr0, vr4, vr6", and the succeeding instruction is a Word addition instruction "vadd vr8, vr10, vr1". In processing by the preceding instruction "vadd vr0, vr4, vr6" and processing by the succeeding instruction "vadd vr8, vr10, vr1", the data dependence relation corresponding to the WAR hazard exists with respect to the vector registers vr[32] to vr[63] with the physical numbers 32 to 63.

As illustrated in FIG. 16A, in the general vector processing device, for example, when the preceding instruction "vadd vr0, vr4, vr6" is issued to the pipeline A in the cycle 1, data are read from the vector registers vr[32] to vr[39] with the physical numbers 32 to 39 in the cycle 5. Therefore, in the cycle 2 to the cycle 5, a stall due to the WAR hazard is made to occur, and the succeeding instruction "vadd vr8, vr10, vr1" for writing a processing result in the vector registers vr[32] to vr[39] with the physical numbers 32 to 39 in the beginning cycle is issued in the cycle 6.

On the other hand, as illustrated in FIG. 16B, in the vector processing device in the second embodiment, for example, the preceding instruction "vadd vr0, vr4, vr6" is issued to the pipeline A in the cycle 1, and this instruction is executed in the pipeline A. Since the data dependence relation corresponding to the WAR hazard exists between the preceding instruction and the succeeding instruction, the instruction issuance control unit 13B generates a new instruction "vadd' vr1, vr5, vr7" which is equivalent to processing of the second half in the preceding instruction, and issues the new instruction to the pipeline B in the cycle 2. Thus, the same processing as the processing performed by the preceding instruction "vadd vr0, vr4, vr6" is executed on the vector registers vr[32] to vr[63] with the physical numbers 32 to 63 from the cycle 2. Accordingly, the succeeding instruction "vadd vr8, vr10, vr1" can be issued to the pipeline C in the cycle 3, and this instruction can be executed. Further, the processing related to the vector registers vr[32] to vr[63] with the physical numbers 32 to 63 by the preceding instruction "vadd vr0, vr4, vr6" is unnecessary, and thus the processing of the preceding instruction "vadd vr0, vr4, vr6" is completed in the cycle 4 and the pipeline A is released.

Further, for example, FIGS. 17A and 17B illustrate a processing operation example of the case where the vector length (VL) is 40, the preceding instruction is a Word addition instruction "vadd vr0, vr4, vr6", and the succeeding instruction is a Word addition instruction "vadd vr8, vr10, vr1". In processing by the preceding instruction "vadd vr0, vr4, vr6" and processing by the succeeding instruction "vadd vr8, vr10, vr1", the data dependence relation corresponding to the WAR hazard exists with respect to the vector registers vr[64] to vr[79] with the physical numbers 64 to 79.

As illustrated in FIG. 17A, in the general vector processing device, for example, when the preceding instruction "vadd vr0, vr4, vr6" is issued to the pipeline A in the cycle 1, data are read from the vector registers vr[64] to vr[71] with the physical numbers 64 to 71 in the cycle 9. Therefore, in the cycle 2 to the cycle 9, a stall due to the WAR hazard is made to occur, and the succeeding instruction "vadd vr8, vr10, vr1" for writing a processing result in the vector registers vr[64] to vr[71] with the physical numbers 64 to 71 in the beginning cycle is issued in the cycle 10.

On the other hand, as illustrated in FIG. 17B, in the vector processing device in the second embodiment, for example, the preceding instruction "vadd vr0, vr4, vr6" is issued to the pipeline A in the cycle 1, and this instruction is executed in the pipeline A. Since the data dependence relation corresponding to the WAR hazard exists between the preceding instruction and the succeeding instruction, the instruction issuance control unit 13B generates a new instruction "vadd' vr1, vr5, vr7" which is equivalent to processing of the second half in the preceding instruction, and issues the new instruction to the pipeline B in the cycle 2. Thus, the same processing as the processing performed by the preceding instruction "vadd vr0, vr4, vr6" is executed on the vector registers vr[64] to vr[79] with the physical numbers 64 to 79 from the cycle 2. Accordingly, the succeeding instruction "vadd vr8, vr10, vr1" can be issued to the pipeline C in the cycle 3, and this instruction can be executed. Further, the processing related to the vector registers vr[64] to vr[79] with the physical numbers 64 to 79 by the preceding instruction "vadd vr0, vr4, vr6" is unnecessary, and thus the processing of the preceding instruction "vadd vr0, vr4, vr6" is completed in the cycle 8 and the pipeline A is released.

Note that in FIGS. 16A and 16B and FIGS. 17A and 17B, for the instruction "vadd vr0, vr4, vr6", the physical number (head value) of the vector register vr0 with the logical number 0 which is a source register is illustrated in every cycle. Further, for the instruction "vadd' vr1, vr5, vr7", the physical number (head value) of the vector register vr1 with the logical number 1 which is a source register is illustrated in every cycle. Further, for the instruction "vadd vr8, vr10, vr1", the physical number (head value) of the vector register vr1 with the logical number 1 which is a destination register is illustrated in every cycle.

When the data dependence relation exists between the preceding instruction and the succeeding instruction, the disclosed instruction control circuit can avoid the data hazard between the preceding instruction and the succeeding instruction without making a stall occur, and issue the succeeding instruction efficiently by generating a new instruction and making the new instruction issue between the preceding instruction and the succeeding instruction.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An instruction control circuit of a vector processing device, the instruction control circuit comprising:
   an instruction buffer which stores a plurality of instructions;
   a data dependence detecting unit which detects a data dependence relation between a preceding instruction and a succeeding instruction which succeeds the preceding instruction among the plurality of instructions inputted from the instruction buffer; and
   an instruction issuance control unit which controls issuance of an instruction based on a detection result in the data dependence detecting unit,
   wherein the instruction issuance control unit
   generates a new instruction including a same instruction type as the preceding instruction when there is a data dependence relation between the preceding instruction and the succeeding instruction, and issues the generated new instruction between the preceding instruction and the succeeding instruction and, in the generation of the new instruction,
   determines identification information of a second register of the new instruction from identification information of a first register of the succeeding instruction in the data dependence relation with the preceding instruction,
   calculates a difference between identification information of a second register of the preceding instruction and the identification information of the second register of the new instruction,
   determines identification information of a first register of the new instruction from the calculated difference and identification information of a first register of the preceding instruction, and
   determines a processing completion cycle of the new instruction from a processing completion cycle of the preceding instruction and a vector length.

2. The instruction control circuit according to claim 1, wherein the instruction issuance control unit determines a cycle for processing which excludes overlapping processing in the preceding instruction and the new instruction among processing by the preceding instruction based on the preceding instruction and the new instruction and the vector length, and changes the processing completion cycle of the preceding instruction to the determined cycle.

3. The instruction control circuit according to claim 1, wherein when there is a data dependence relation corresponding to a RAW hazard between the preceding instruction and the succeeding instruction, the instruction issuance control unit determines identification information of a destination register of the new instruction from identification information of a source register of the succeeding instruction in the data dependence relation with the preceding instruction, calculates a difference between identification information of a destination register of the preceding instruction and the identification information of the destination register of the new instruction, and determines identification information of a source register of the new instruction from the calculated difference and identification information of a source register of the preceding instruction.

4. The instruction control circuit according to claim 1, wherein when there is a data dependence relation corresponding to a WAR hazard between the preceding instruction and the succeeding instruction, the instruction issuance control unit determines identification information of a first source register of the new instruction from identification information of a destination register of the succeeding instruction in the data dependence relation with the preceding instruction, calculates a difference between identification information of a first source register of the preceding instruction in the data dependence relation with the succeeding instruction and the identification information of the first source register of the new instruction, and determines identification information of a second source register and identification information of a destination register of the new instruction from the calculated difference and identification information of a second source register and identification information of a destination register of the preceding instruction.

5. The instruction control circuit according to claim 1, wherein the instruction issuance control unit selects issuing an instruction from the instruction buffer or issuing the generated new instruction according to a detection result in the data dependence detecting unit.

6. A processor, comprising:

an instruction buffer which stores a plurality of instructions;

a data dependence detecting unit which detects a data dependence relation between a preceding instruction and a succeeding instruction which succeeds the preceding instruction among the plurality of instructions inputted from the instruction buffer;

an instruction issuance control unit which controls issuance of an instruction based on a detection result in the data dependence detecting unit; and a plurality of instruction executing units which are operable in parallel, receive instructions issued from the instruction issuance control unit independently from each other, and execute vector calculation processing according to the instructions, wherein the instruction issuance control unit generates a new instruction including a same instruction type as the preceding instruction when there is a data dependence relation between the preceding instruction and the succeeding instruction, and issues the generated new instruction between the preceding instruction and the succeeding instruction and, in the generation of the new instruction, determines identification information of a second register of the new instruction from identification information of a first register of the succeeding instruction in the data dependence relation with the preceding instruction, calculates a difference between identification information of a second register of the preceding instruction and the identification information of the second register of the new instruction, determines identification information of a first register of the new instruction from the calculated difference and identification information of a first register of the preceding instruction, and determines a processing completion cycle of the new instruction from a processing completion cycle of the preceding instruction and a vector length.

7. An instruction control method of a vector processing device, the instruction control method comprising:

detecting, by a data dependence detecting unit included in the vector processing device, a data dependence relation between a preceding instruction and a succeeding instruction which succeeds the preceding instruction among a plurality of instructions inputted from an instruction buffer which stores the plurality of instructions;

controlling, by an instruction issuance control unit included in the vector processing device, issuance of an instruction based on a detection result of the data dependence relation; and generating, by the instruction issuance control unit, a new instruction including a same instruction type as the preceding instruction when there is a data dependence relation between the preceding instruction and the succeeding instruction, and issuing the generated new instruction between the preceding instruction and the succeeding instruction and, in the generation of the new instruction, determining identification information of a second register of the new instruction from identification information of a first register of the succeeding instruction in the data dependence relation with the preceding instruction, calculating a difference between identification information of a second register of the preceding instruction and the identification information of the second register of the new instruction, determining identification information of a first register of the new instruction from the calculated difference and identification information of a first register of the preceding instruction, and determining a processing completion cycle of the new instruction from a processing completion cycle of the preceding instruction and a vector length.

* * * * *